United States Patent
Kurjanowicz et al.

(10) Patent No.: US 10,373,084 B2
(45) Date of Patent: Aug. 6, 2019

(54) INTEGRATED RESOURCE TRACKING SYSTEM

(71) Applicant: ADP, LLC, Roseland, NJ (US)

(72) Inventors: Agatha Kurjanowicz, Ottawa (CA); Lohit J. Sarma, New York, NY (US); Masheed Michael Ahadi, Brooklyn, NY (US); Zachary Skolnik, New York City, NY (US); Alain Brown, Brooklyn, NY (US); Omar Scott, Brooklyn, NY (US); Jason A. Lovelace, Montclair, NJ (US); Matthew Paul Herman, Hoboken, NJ (US)

(73) Assignee: ADP, LLC, Roseland, NJ (US)

( * ) Notice: Subject to any disclaimer, the term of this patent is extended or adjusted under 35 U.S.C. 154(b) by 482 days.

(21) Appl. No.: 14/945,779

(22) Filed: Nov. 19, 2015

(65) Prior Publication Data
US 2016/0275436 A1    Sep. 22, 2016

Related U.S. Application Data

(60) Provisional application No. 62/134,898, filed on Mar. 18, 2015.

(51) Int. Cl.
*G06Q 10/00* (2012.01)
*G06Q 10/06* (2012.01)
*H04L 29/08* (2006.01)

(52) U.S. Cl.
CPC .......... *G06Q 10/063114* (2013.01); *G06Q 10/06398* (2013.01); *H04L 67/22* (2013.01)

(58) Field of Classification Search
CPC ...... G06Q 10/063114; G06Q 10/06398; H04L 67/22
See application file for complete search history.

(56) References Cited

U.S. PATENT DOCUMENTS 7,203,655 B2 * 4/2007 Herbert ............ G06Q 10/06398
705/7.42
7,305,392 B1   12/2007 Abrams et al.
(Continued)

FOREIGN PATENT DOCUMENTS

WO   2001082171 A1   11/2001

OTHER PUBLICATIONS

Learning analytics, T Elias—Learning, 2011—pdfs.semanticscholar.org.*
(Continued)

*Primary Examiner* — Jonathan G Sterrett
(74) *Attorney, Agent, or Firm* — Yee & Associates, P.C.

(57) ABSTRACT

A computer network including a server computer, a first computer implementing a first software tool having a first function and a second software tool having a second function, and a second computer implementing the first software tool and the second software tool. The server computer is configured to gather first data regarding use of the first software tool; gather second data regarding use of the second software tool; and based on the first data and the second data, link activities of the first user and the second user to a performance goal for any one of the first user, the second user, a team including at least the first user or the second user, or an organization to which the first user and the second user belong. In executing the third program code, a communications link between the server computer and the first computer or the second computer is improved.

17 Claims, 17 Drawing Sheets

(56) References Cited

U.S. PATENT DOCUMENTS

| | | | |
|---|---|---|---|
| 8,768,751 B2 | 7/2014 | Jakowski et al. | |
| 2002/0123945 A1 | 9/2002 | Booth et al. | |
| 2003/0023685 A1 | 1/2003 | Cousins et al. | |
| 2005/0144025 A1 | 7/2005 | Katz et al. | |
| 2006/0190480 A1 | 8/2006 | Ori et al. | |
| 2007/0100938 A1* | 5/2007 | Bagley | G06Q 10/10 709/204 |
| 2009/0265634 A1* | 10/2009 | Beringer | G06F 8/38 715/733 |
| 2010/0324964 A1* | 12/2010 | Callanan | G06Q 10/06 705/322 |
| 2012/0089562 A1* | 4/2012 | Deremigio | G06F 17/30563 707/602 |
| 2014/0058801 A1* | 2/2014 | Deodhar | G06Q 10/0639 705/7.38 |
| 2014/0081715 A1* | 3/2014 | Govindaraman | G06Q 10/06398 705/7.42 |
| 2014/0372539 A1* | 12/2014 | Zaveri | H04L 51/046 709/206 |
| 2015/0066896 A1* | 3/2015 | Davis | G06F 17/30991 707/710 |
| 2015/0088851 A1* | 3/2015 | Deshpande | G06F 17/30905 707/708 |
| 2017/0116552 A1* | 4/2017 | Deodhar | G06Q 10/06316 |
| 2017/0221072 A1* | 8/2017 | Athulurutlrumala | G06Q 30/014 |

OTHER PUBLICATIONS

"Too much Information: Managing Distractions in the Workplace", Murphy, Tom, CMS Wire, Feb. 12, 2015.*

"Sapience Analytics helps companies audit staff's time spent at work", Sep. 17, 2012, Sapre, Omkar, The Economic Times.*

* cited by examiner

```
1  [
2    {
3      "id" : 9,
4      "title" : "Client Side Auditing",
5      "description" : "Client usage and action recording of non-button Form Controls",
6      "notes" : "Add usage tracking to the following UI components: DateTime, Filter, Group, Number, Logical, Lookup, Picklist, Text",
7      "source" : "Rally",
8      "source_id" : "US154433",
9      "created_at" : "2014-09-13T04:52:18.448Z",
10     "updated_at" : "2014-09-13T04:52:18.448Z",
11     "tags" : [
12       {
13         "name" : "Sprint 14"
14       }
15     ],
16     "people" : [
17       {
18         "first_name" : "Zack"
19         "last_name" : "Smith",
20         "email" : "zack.smith@adp.com"
21       }
22     ]
23   }
24 ]
```

1300

FIG. 13

INTEGRATED RESOURCE TRACKING SYSTEM

This application claims priority to, and is a non-provisional application based on, provisional application 62/134,898, filed Mar. 18, 2015.

BACKGROUND INFORMATION

1. Field

The illustrative embodiments relate to improved computers and computer networks, particularly server computers having an integrated resource tracking system and, more particularly, to a method and system which integrates multiple systems and applications together to determine trends by analyzing tags and/or keywords of multiple users over the multiple integrated systems and applications.

2. Background

Organizations have always had a need to manage, organize, track, and direct its ongoing activities. The well-known status report has been one technique for organization management. Status reports may provide information on the status of a person, activity, thing, project, group, an entire organization, or many other things. Thus, for example, a status report may relay information regarding the state of projects within an organization in relation to an overall goal of the organization. In still another example, a periodic status report may enable a manager to track performance and progress by an individual. Other examples may include tracking projects within teams, supporting communication of teams to executive management, monitoring project progress, monitoring accomplishments, identifying bottlenecks, and/or identifying blocks. Many other examples are possible.

Manual means for generating and tracking such reports are inadequate for modern organizations. In many cases, the process of manually generating or collating reports is undesirably time consuming. In some cases, consolidation and alignment of different reports is unavailable. Thus, there may not be visibility on peer and cross team activities, multi-member project information may be repeated without alignment, links to organization objectives may be intangible, and other problems may arise. Another difficulty with manual techniques is that data for reports may be out of date by the time the report is to be evaluated.

Progress has been made with respect to addressing these difficulties using automated techniques. For example, templates with drop-down entries or blanks may speed the report generation process. Programs such as OUTLOOK® may be used to track projects, deadlines, or work activities. Programs such as RALLY® may be used to track software development projects. Programs such as YAMMER® may be used to provide a specialized social networking service to help organize groups, share files, and collaborate on projects. Many different kinds of these such programs exist.

In fact, there has been a proliferation of enterprise, project management, report generation, and human resource capital programs. Some modern work environments may use many such programs, but the individual user must track the use of such programs. Currently, there is no mechanism for integrating such tools on a dynamic basis, tools which may be published or produced by a wide variety of different companies or individuals. Often, integration of different such tools is impossible or impractical.

SUMMARY

The illustrative embodiments provide for a computer network. The computer network includes a server computer having a server processor and a server non-transitory computer readable storage medium. The computer network also includes a first computer, operable by a first user, in communication with the server computer. The first computer has a first processor and a first non-transitory computer readable storage medium storing first program code which, when executed by the first processor, implements a first software tool having a first function and a second software tool having a second function. The computer network also includes a second computer, operable by a second user, in communication with the server computer, the second computer having a second processor and a second non-transitory computer readable storage medium storing second program code which, when executed by the second processor, implements the first software tool having the first function and the second software tool having the second function. The server non-transitory computer readable storage medium stores third program code which, when executed by the server processor, is configured to gather first data regarding use of the first software tool; gather second data regarding use of the second software tool; and based on the first data and the second data, link activities of the first user and the second user to a performance goal for any one of the first user, the second user, a team including at least the first user or the second user, or an organization to which the first user and the second user belong. In executing the program code, a communications link between the first computer and the second computer is improved.

The illustrative embodiments also provide for an apparatus. The apparatus includes a server computer having a server processor and a server non-transitory computer readable storage medium. The server computer is in communication with a first computer, operable by a first user. The first computer has a first processor and a first non-transitory computer readable storage medium storing first program code which, when executed by the first processor, implements a first software tool having a first function and a second software tool having a second function. The server computer is in communication with a second computer, operable by a second user, the second computer having a second processor and a second non-transitory computer readable storage medium storing second program code which, when executed by the second processor, implements the first software tool having the first function and the second software tool having the second function. The server non-transitory computer readable storage medium stores third program code which, when executed by the server processor, is configured to: gather first data regarding use of the first software tool; gather second data regarding use of the second software tool; and based on the first data and the second data, link activities of the first user and the second user to a performance goal for any one of the first user, the second user, a team including at least the first user or the second user, or an organization to which the first user and the second user belong. In executing the program code, the server computer improves a communication links between the first computer and the second computer.

The illustrative embodiments also provide for a method implemented in a server computer having a server processor and a server non-transitory computer readable storage medium, the server computer being in communication with a first computer, operable by a first user, wherein the first computer has a first processor and a first non-transitory computer readable storage medium storing first program code which, when executed by the first processor, implements a first software tool having a first function and a second software tool having a second function, the server computer being in communication with a second computer, operable by a second user, the second computer having a second processor and a second non-transitory computer readable storage medium storing second program code which, when executed by the second processor, implements the first software tool having the first function and the second software tool having the second function. The server non-transitory computer readable storage medium stores third program code which, when executed by the server processor, implements the method. The method includes gathering first data regarding use of the first software tool. The method also includes gathering second data regarding use of the second software tool. The method also includes improving, using the server computer, a communications link between the first computer and the second computer by linking, based on the first data and the second data, activities of the first user and the second user to a performance goal for any one of the first user, the second user, a team including at least the first user or the second user, or an organization to which the first user and the second user belong.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an example of an application programming interface usable in a resource tracking system, in accordance with an illustrative embodiment;

DETAILED DESCRIPTION

Figure 1:
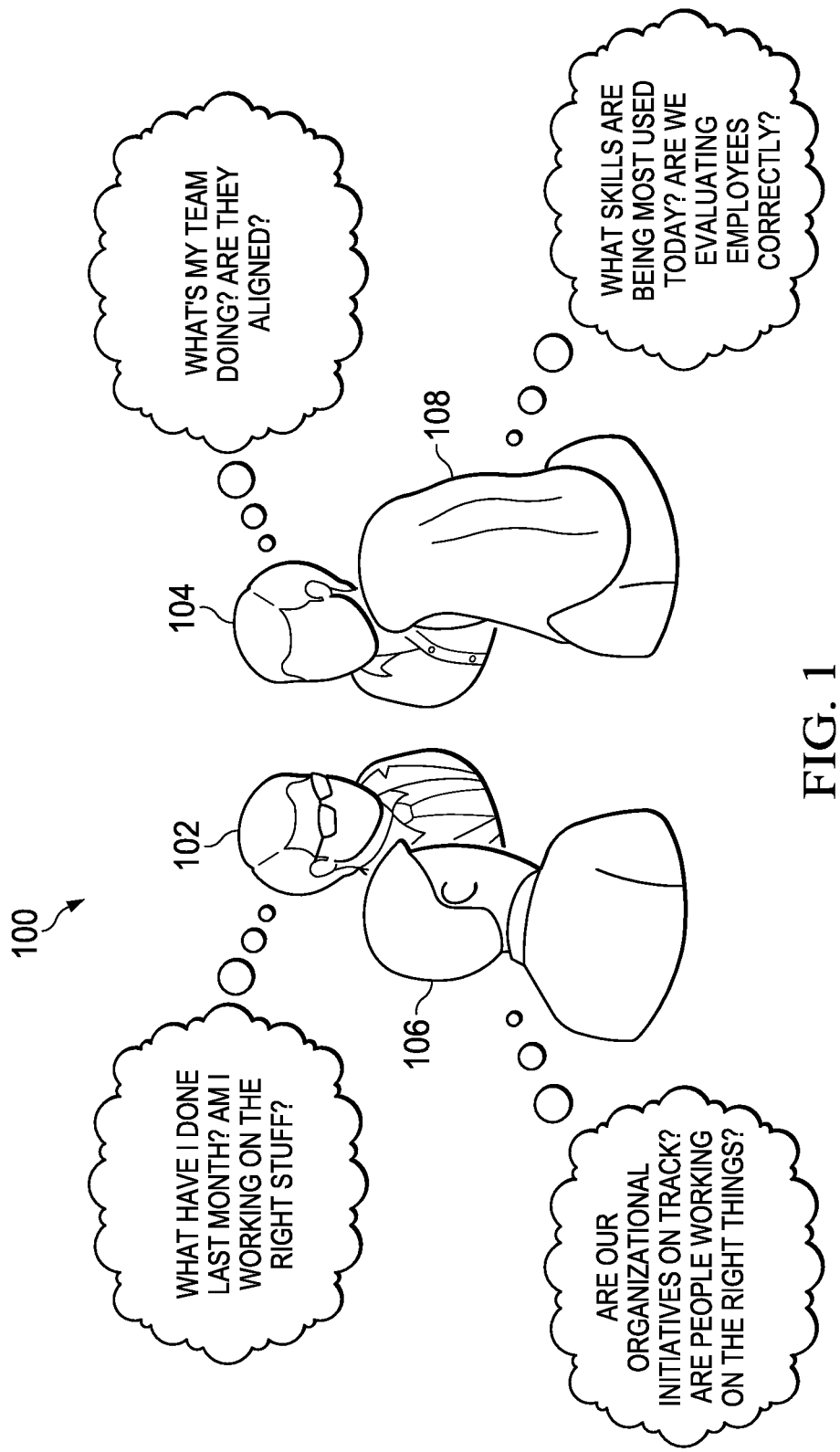
FIG. 1 is an illustration of different roles of different individuals in an organization, in accordance with an illustrative embodiment.

The illustrative embodiments recognize and take into account that a multiplicity of reporting, tracking, scheduling, and project management software may result in an unwieldy system for producing reports, tracking a project, monitoring individual performance or progress, or otherwise monitoring and tracking the performance of an organization.

The illustrative embodiments may, broadly speaking, be referred to as a tracker. The tracker is embodied as a physical machine, or as program code stored on a non-transitory computer readable storage medium which subsequently makes one or more computers perform more efficiently.

Purposes of the tracker of the illustrative embodiments may include enriching organization operations, consolidating real information about an organization, and providing metrics for leaders, managers, and individuals to ensure organization is aligned and individuals are on track to complete their tasks and responsibilities. The tracker of the illustrative embodiments aims to reduce or eliminate the process of manual status reporting by providing simple tools for parsing information about individual activities. By building a visual pinboard of 'My Work', individuals can quickly visualize their work life and work activity.

Thus, the tracker of the illustrative embodiments provides quick insights into the top trends within an organization. The tracker provides links to the tools an organization already uses, including third party applications. The tracker can integrate with numerous third party tools and may have an exposed application programming interface (API) that allows third party applications to integrate with its activity feed. Default APIs may be provided for commonly used programs such as, but not limited to, RALLY®, OUTLOOK®, CONFLUENCE®, and YAMMER®.

In computer programming, an API is a set of routines, protocols, or tools used for building software applications. An API may express a software component in terms of its operations, inputs, outputs, and underlying types. An API may define functionalities that are independent of their respective implementations, which allows definitions and implementations to vary without compromising an interface. An API may make developing a software program easier by providing the building blocks for the software program. A programmer, or another software program, can then put the blocks together.

The tracker of the illustrative embodiments may bridge a gap between goal management and ongoing organization activity by allowing a user to link, manually or automatically, activities to defined goals. For example, users can manually select an activity feed from an external source, and link it to a given goal. In another example, users can automatically associate a tag or reference to a particular goal. When an activity comes in the feed with a link to that tag or reference, the activity may be automatically associated with the related goal.

The illustrative embodiments may provide quick insights into the trends within an organization by identifying tags and most common terms and word references through text and data mining. Trends can be measured on an overall company metric, by department, team, and individual.

The illustrative embodiments may show cross-departmental collaboration and alignment by assessing information about individuals collaborating together on a given activity. The illustrative embodiments may provide an up to date status-tracking tool that shows the overarching organizational activity in alignment to the overall organizational, team, and individual goals.

The functionality behind the tracker of the illustrative embodiments includes both product functionality and a new product. The functionality of the illustrative embodiments includes the ability to integrate external third party sources such as, but not limited to, CONFLUENCE®, OUTLOOK®, RALLY®, YAMMER®, and others, with an aggregator in order to perform one or more functions. These functions include the ability to track activities users perform on daily, weekly, monthly, and yearly bases; or, to find top trends within an organization.

The tracker of the illustrative embodiments may link relevant organization activity, such as the work workers perform on a daily and ongoing base, with human resources, performance, strategic planning, and talent management. The tracker may aggregate information from third party APIs and pool them to provide insights into the knowledge and work within the company. This knowledge then may be leveraged in order to identify the trending activities within a company and used to identify internal dialect, acronyms, and knowledge.

The tracker of the illustrative embodiments can also leverage the information gathered from third party integration tools in order to build out a competency catalog that is aligned with the work being done within the company. From a strategic management perspective, the tracker may provide insights into the types of activities being performed in order to achieve various types of goals.

For example, the tracker can identify requirements for the goal to 'build a new product'. The product manager typically may spend the first few weeks of the goal's start dates doing research and meeting with the user experience and user interface teams. The product manager may also typically spend a few months after the start of a goal in a program such as RALLY®, building features and user stories, and in meetings with a scrum team. The product manager may also spend several months into the goal working with product marketing in order to build "go to market" trends.

From an individual review perspective, the tracker of the illustrative embodiments can provide a timeline of all the work an individual has done throughout the course of the performance cycle. In this context, the individual can view an interactive map that shows their work patterns, key collaborators, and overall accomplishments throughout the year.

The illustrative embodiments may also have the ability to integrate with reward and feedback modules, and may provide a tool for building or cascading strategic goals and defining performance review cycles. Beyond human resource data, the tracker of the illustrative embodiments can provide tools to link with project management and customer relationship management solutions in order to incorporate project plans, customer data, and related tasks into the tracker and its human resource processes.

FIG. 1 is an illustration of different roles of different individuals in an organization, in accordance with an illustrative embodiment. Team environment 100 may be two or more individuals working towards a common goal, possibly within a single organization but possibly operating in different organizations. Person 102 may be a lower-level worker whose purpose is to implement specific tasks with respect to an aspect of the goal. For example, if person 102 were an engineer, person 102 might keep track of issues such as what progress has the person made on a design project within a time period, whether he or she is working on the correct action items, whether milestones have been met, or possibly many other engineering level issues.

In turn, person 104 may be a team leader with several engineers operating under person 104, including person 102. As a team leader, person 104 may keep track of team goals, track individual and group performance, track whether worker goals are aligned, or possibly many other matters.

At a higher level of organization, person 106 may be an executive responsible for managing the project, or possibly an entire enterprise or organization. Thus, person 106 may be concerned with different matters, such as whether organizational initiatives are on track, whether teams or individuals are working on the correctly assigned projects, whether teams are operating within budget, and possibly many other matters.

In addition, for larger organizations, other departments may be involved, such as person 108 who is responsible for some aspect of human resource management. Such a person may be responsible for tracking what skills are being used most, whether persons in the organization are being evaluated correctly, determining what skills are needed, and possibly many other matters.

The tracker of the illustrative embodiments allows each one of these persons to answer these questions and more. The tracker of the illustrative embodiments improves the efficiency and speed of computer networks by quickly analyzing and reporting desirable information. The tracker of the illustrative embodiments may also allow individual users access to tailored information important to their particular role.

For example, the illustrative embodiments may allow person 102 to quickly align work activities with business objectives, gather continuous feedback on project performance, and quickly obtain peer support, and many other aspects of performing his or her role, all by integrating the various software tools used by person 102. Examples of this use of the tracker of the illustrative embodiments are described further below. Likewise, the tracker of the illustrative embodiments can similarly assist each person of person 104, person 106, and person 108 to accomplish their roles within the organization, and thereby more efficiently or more quickly achieve the goals of the organization.

Figure 2:
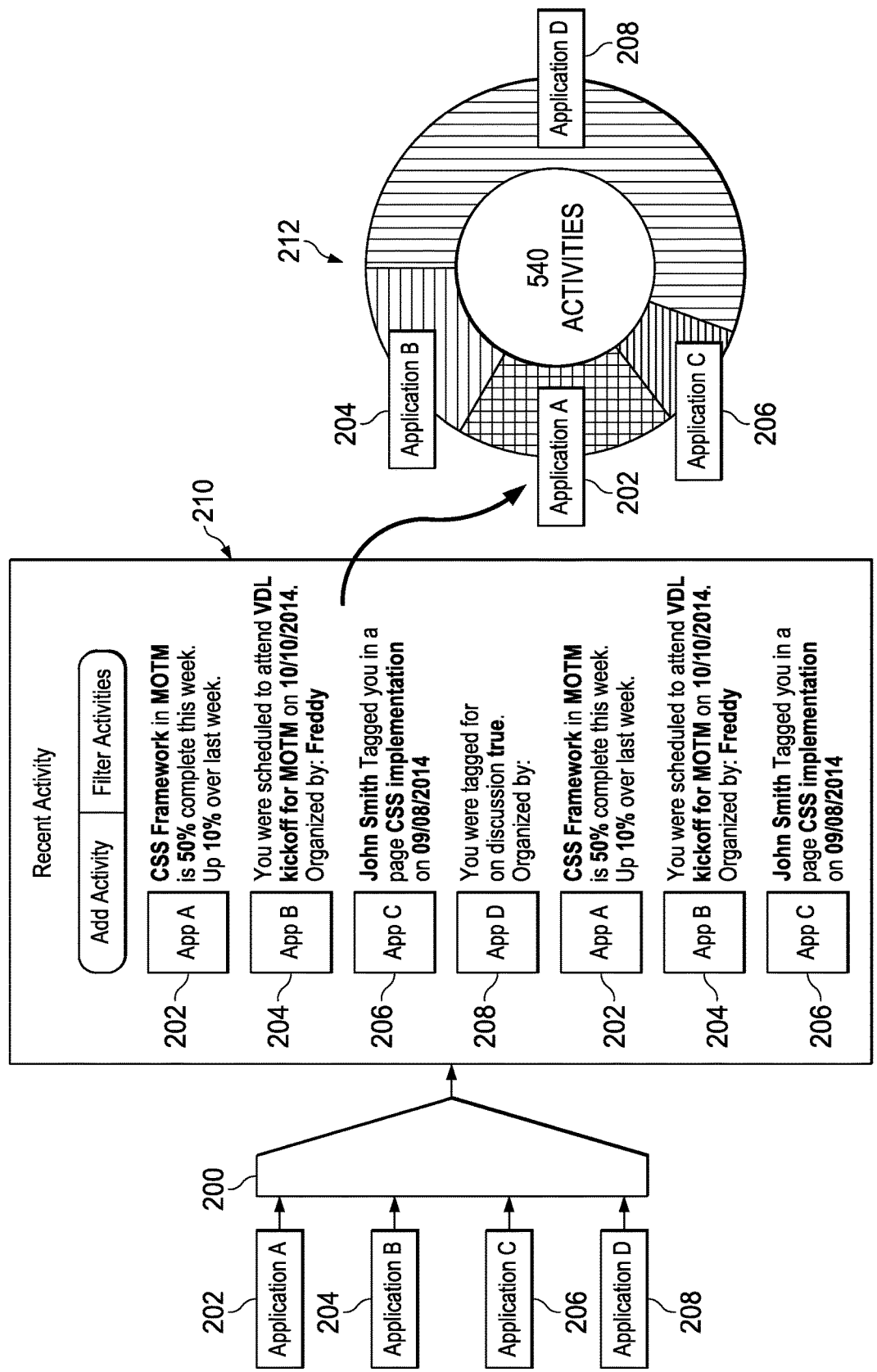
FIG. 2 illustrates a resource tracking system, in accordance with an illustrative embodiment.

FIG. 2 is a block diagram illustrating a resource tracking system, in accordance with an illustrative embodiment. Resource tracking system 200 is implemented on a server computer, such as computing system 1600 of FIG. 16 or data processing system 1800 of FIG. 18. Alternatively, resource tracking system 200 may be implemented as a network of multiple computers. Optionally, resource tracking system 200 may be implemented on a single client computer.

In any case, resource tracking system 200 preferably receives input from multiple applications or tools, though possibly resource tracking system 200 could receive information only from a single application or tool. Resource tracking system 200 may directly link organizational activity to organizational goals to show organizational alignment and progress. Resource tracking system 200 may show organizational trends and changes in organizational velocity, as described further below. This functionality may be achieved by leveraging tagging and text mining to identify common terms and acronyms within the organization, and tracking their overall usage over time. Resource tracking system 200 may also be used for integration with worker feedback and performance management.

In the illustrative embodiment shown in FIG. 2, resource tracking system 200 receives input from four applications or tools, including application A 202, application B 204, application C 206, and application D 208. Resource tracking system 200 receives the output from each application, or actively retrieves desired information from each application, and then collates the aggregate information into a form which is useful for tracking aspects of an organizational, team, or personal goal. Resource tracking system 200 then may present this information to the user, or possibly generate a report for the user. This information could be presented in many different ways, as described here and further below.

For example, an output of resource tracking system 200 may be to display on a tangible display device recent activities performed by the user of each of the applications. Thus, for example, recent activities display 210 may show that application A 202 may show that a particular percentage of completion towards a project has been met, and how that percentage corresponds to the prior week's performance. In another example, recent activities display 210 may show scheduling information from application B 204. In still another example, recent activities display 210 may show social networking information from application C 206. In yet another example, recent activities display 210 may show different social networking or scheduling information from a different program, namely application D 208.

Resource tracking system 200 may display this type of information in different manners. For example, the graphical user interface may show circular chart 212 indicating a proportional use of each of application A 202, application B 204, application C 206, and application D 208. A total number of activities may be displayed in the center of circular chart 212.

The information obtained and collated and modified by resource tracking system 200 may be presented in a variety of different ways. Thus, the illustrative embodiments are not necessarily limited to the techniques shown in FIG. 2. For example, alternative methods for collating and displaying information are shown in FIG. 3 through FIG. 10.

Figure 3:
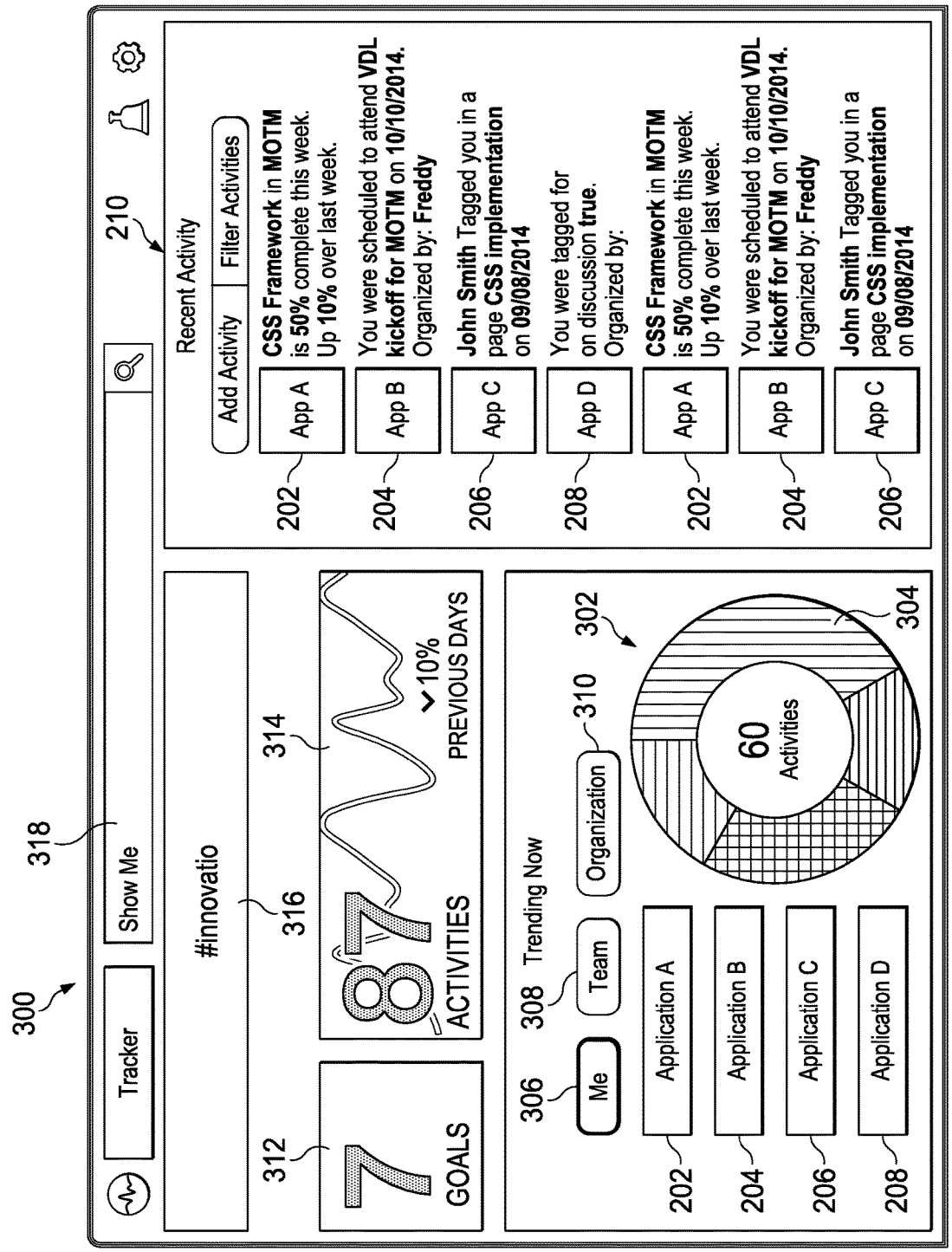
FIG. 3 illustrates a view of a resource tracking system, in accordance with an illustrative embodiment.

FIG. 3 is a block diagram illustrating a view of a resource tracking system, in accordance with an illustrative embodiment. Graphical user interface 300 may display a result of the operation of a resource tracking system, such as resource tracking system 200 of FIG. 2. Thus, FIG. 3 and FIG. 2 share common reference numerals and have similar descriptions. Graphical user interface 300 may be implemented on a tangible display based on output from hardware or software stored on a non-transitory computer readable storage medium and executed by a processor.

FIG. 3 shows a variation of a graphical user interface for an output of resource tracking system 200 of FIG. 2. Thus, for example, recent activities display 210 is shown, along with circular graph 302. Circular graph 302 may be colored, hashed, or otherwise highlighted in each section to identify an application visually. Thus, for example, section 304 could be colored red or hashed or otherwise highlighted, with the highlighting visually informing the user that application A is used in the most number of activities among a total of 60 activities.

Different areas of graphical user interface 300 may be selectable by a user in order to display different information. For example, what is displayed may be organized by an individual, such as "me" button 306. Information for all of the applications used by a team may be selected by selecting "team" button 308. Information for the entire organization may be selected by selecting "organization" button 310. In each case, proportionate use of each application may be displayed in circular graph 302 and/or recent activities display 210.

Other information may also be displayed. For example, graphical user interface 300 may display the number of goals being tracked in area 312. Graphical user interface 300 may display the number of activities performed over time in the form of a graph, as shown in area 314. Another area, area 316, may show a name or other identifier of a particular project taken from of a list of projects involved in an overall project, with the information relating to the particular project shown elsewhere on graphical user interface 300.

Other user input areas or information display areas may be present on graphical user interface 300. For example, a search term input area 318 may be present to allow a user to drill down into specific information. Other areas may be selectable on graphical user interface 300 to access other functionalities.

Figure 4:
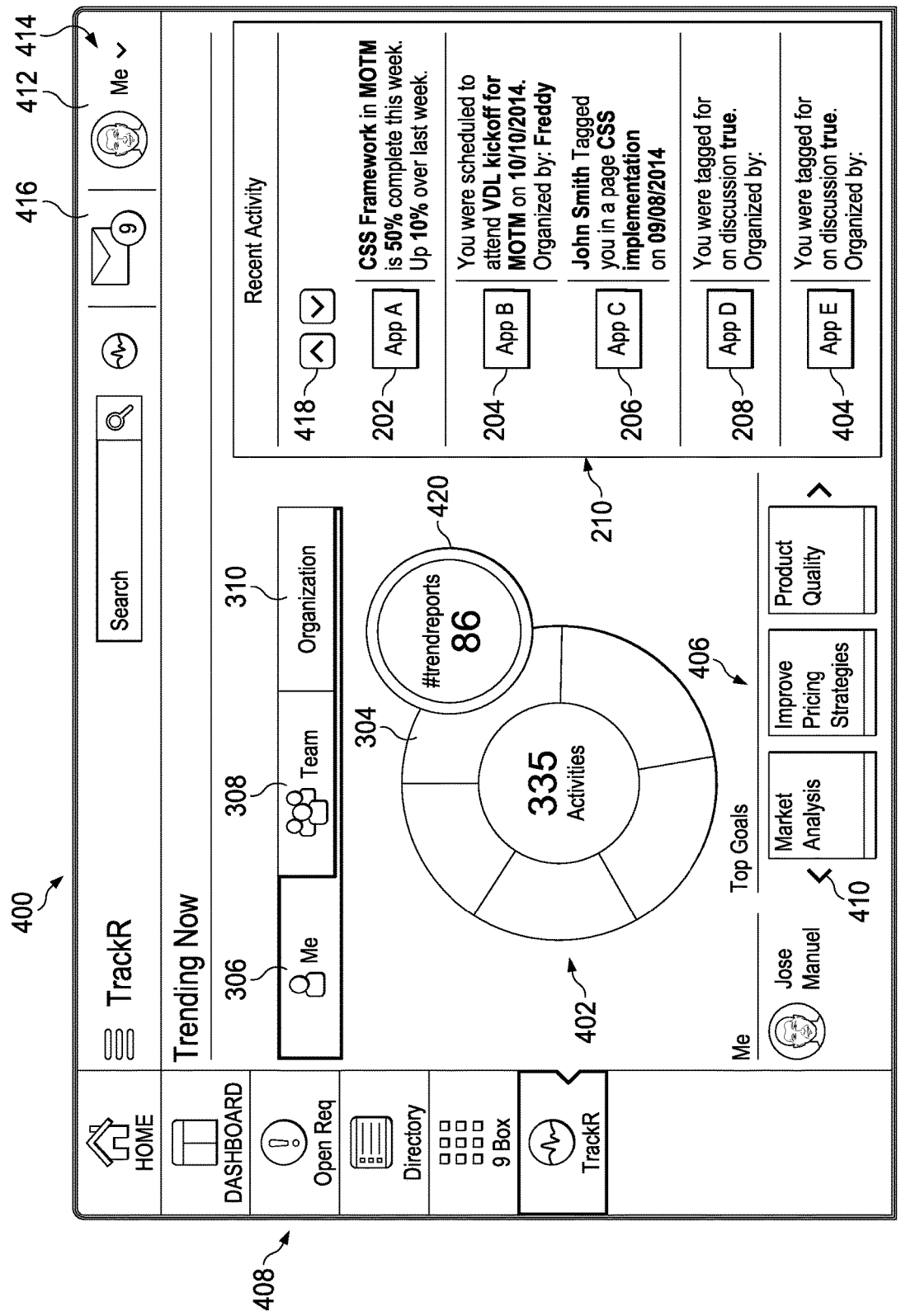
FIG. 4 illustrates a view of a resource tracking system, in accordance with an illustrative embodiment.

FIG. 4 is a block diagram illustrating a view of a resource tracking system, in accordance with an illustrative embodiment. Graphical user interface 400 may display a result of the operation of a resource tracking system, such as resource tracking system 200 of FIG. 2. Thus, FIG. 4 and FIG. 2 share common reference numerals and have similar descriptions. Graphical user interface 400 may be a variation of graphical user interface 300 of FIG. 3. Graphical user interface 400 may be implemented on a tangible display based on output from hardware or software stored on a non-transitory computer readable storage medium and executed by a processor.

Graphical user interface 400 shows additional details and functionality relative to graphical user interface 300 of FIG. 3. Like graphical user interface 300 of FIG. 3, graphical user interface 400 shows circular graph 402 which shows proportional use of five programs or tools, which now include application E 404. The center of circular graph 402 may show the number of activities related to the group and the goal selected. This selection may be made by selecting any one of "me" button 306, "team" button 308, or "organization" button 310.

Circular graph 402 may be designed such that goals are displayed from largest to smallest by number of activities in a clockwise manner, with a starting point of twelve o'clock. Colors, hashing, or other highlighting may remain consistent such that the same color or highlighting indicates the largest activity. Alternatively, colors may indicate which program or activity type is displayed.

Additional functionality is provided in navigation bar 408, such as a "home" button to return a user to a home page, a dashboard button to change information shown in graphical user interface 400, and other buttons as shown to access other functionalities. In addition, goals may be shown in area 406 of graphical user interface 400. Arrows 410 may be provided to cycle through or find additional goals. Clicking on one of the goals will show the statistical information and recent activities, thereby changing circular graph 402 and recent activities display 210. Additionally, the current user may be displayed in area 412, a designation which may be changed by selection of area 414.

Other areas may show other functionalities or information, such as mail button 416, which allows a user to view mail collected by one or more of the applications (application A 202, application B 204, application C 206, application D 208, or application E 404). In another example, arrows 418 may be used to scroll through recent activities. The displayed areas may be selectable in order to bring up information about them or to call other functionalities. Alternatively, the activities may be static or not selectable in order to prevent modifying what is shown in recent activities display 210.

In addition, graphical user interface 400 also includes one or more pop-up displays when a user moves a cursor over a section of circular graph 402, such as pop-up display 420. Such a pop-up display may display additional information, such as the number activities accounted for by the application represented by section 304.

As noted above, circular graph 402, which may be characterized as a pie chart, may show either activities or applications in use, or both. In the illustrative embodiment shown in FIG. 4, circular graph 402 may show the top five activities relating to the currently selected goal. Clicking a section or running a cursor over a section may show activity name and count. The color of other sections may become dull if a current activity type is selected. The sum of each activity may equal the total number of activities displayed in the center. In other illustrative embodiments, the number of applications used in the activities may be displayed and relative application use shown in circular graph 402. Thus, the illustrative embodiments are not necessarily limited by the specific example shown in FIG. 4.

Figure 5:
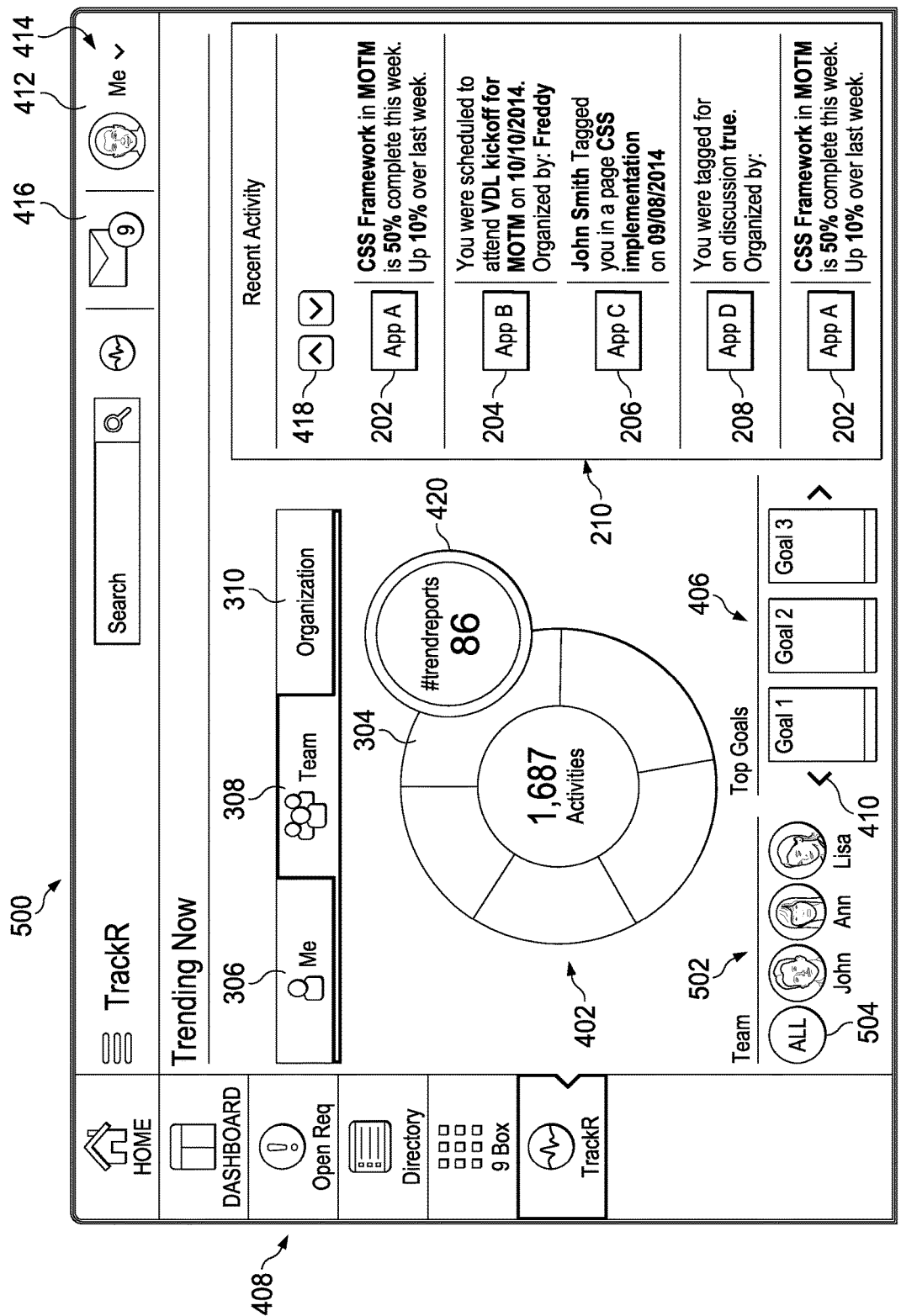
FIG. 5 illustrates a view of a resource tracking system, in accordance with an illustrative embodiment.

FIG. 5 is a block diagram illustrating a view of a resource tracking system, in accordance with an illustrative embodiment. Graphical user interface 500 may display a result of the operation of a resource tracking system, such as resource tracking system 200 of FIG. 2. Thus, FIG. 5 and FIG. 2 share common reference numerals and have similar descriptions. FIG. 5 also shares common reference numerals with similar descriptions within FIG. 4. Graphical user interface 500 may be a variation of graphical user interface 300 of FIG. 3 or graphical user interface 400 of FIG. 4. Graphical user interface 500 may be implemented on a tangible display based on output from hardware or software stored on a non-transitory computer readable storage medium and executed by a processor.

Graphical user interface 500 shows an effect of selecting "team" button 308, relative to graphical user interface 400 shown in FIG. 4. In this case, area 502 now shows members of the team. The icon representing each person may be selected for information regarding that individual's activities and performance. In an illustrative embodiment, "all" icon 504 may be selected such that a manager can view a combined view of the activities for the team they manage. The number of activities in graphical user interface 500 shows this combined number. Circular graph 402 may be updated as a result of selecting one of the individuals (showing activities for that person) or the group (showing activities for the team as a whole). The updated circular graph may display activities or applications used accordingly.

In a specific illustrative embodiment, recent activities display 210 need not be updated when a user clicks on different groups or goals. Alternatively, updates or changes may be indicated in recent activities display 210 when a user clicks on different individuals in area 502, or "all" icon 504.

Figure 6:
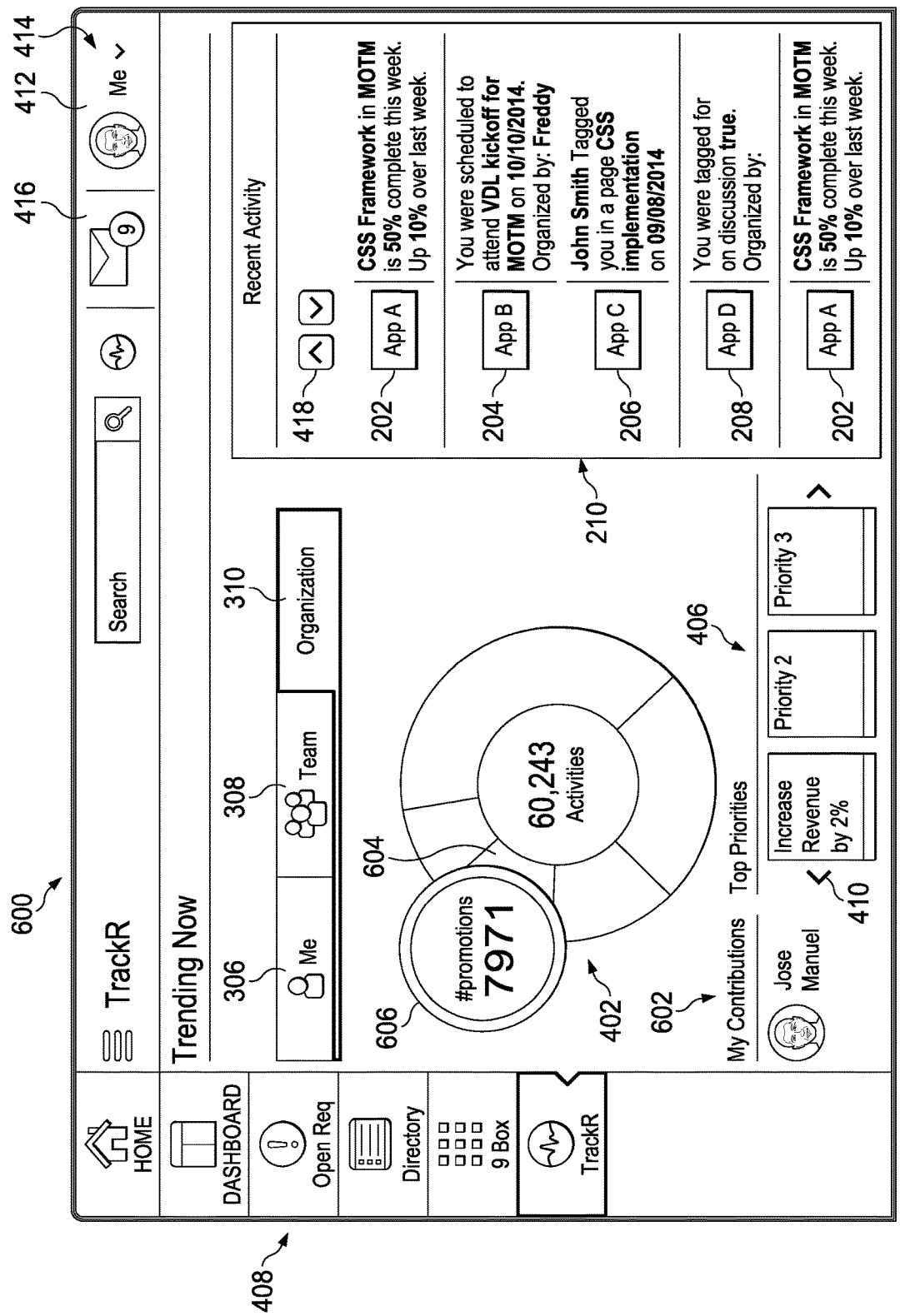
FIG. 6 illustrates a view of a resource tracking system, in accordance with an illustrative embodiment.

FIG. 6 is a block diagram illustrating a view of a resource tracking system, in accordance with an illustrative embodiment. Graphical user interface 600 may display a result of the operation of a resource tracking system, such as resource tracking system 200 of FIG. 2. Thus, FIG. 6 and FIG. 2 share common reference numerals and have similar descriptions. FIG. 6 also shares common reference numerals with similar descriptions within FIG. 4. Graphical user interface 600 may be a variation of graphical user interface 300 of FIG. 3, graphical user interface 400 of FIG. 4, or graphical user interface 500 of FIG. 5. Graphical user interface 600 may be implemented on a tangible display based on output from hardware or software stored on a non-transitory computer readable storage medium and executed by a processor.

Graphical user interface 600 shows an effect of selecting "organization" button 310, relative to graphical user interface 400 shown in FIG. 4 or graphical user interface 500 shown in FIG. 5. In this case, area 602 now shows a button which may be selected to indicate the user's particular contributions to the team. Circular graph 402 may be updated as a result of selecting "organization" button 310. The updated circular graph may display activities performed by the entire organization as a whole or applications used by the entire organization as a whole. In graphical user interface 600, section 604 is selected and pop-up window 606 indicates the number of activities performed in that section. In this particular example, a number of promotions are shown, which are part of the total number of activities shown.

The illustrative embodiments shown in FIG. 4 through FIG. 6 may be varied. For example, the location of various icons and areas may be varied. Thus, these specific examples do not necessarily limit the claimed illustrative embodiments.

Figure 7:
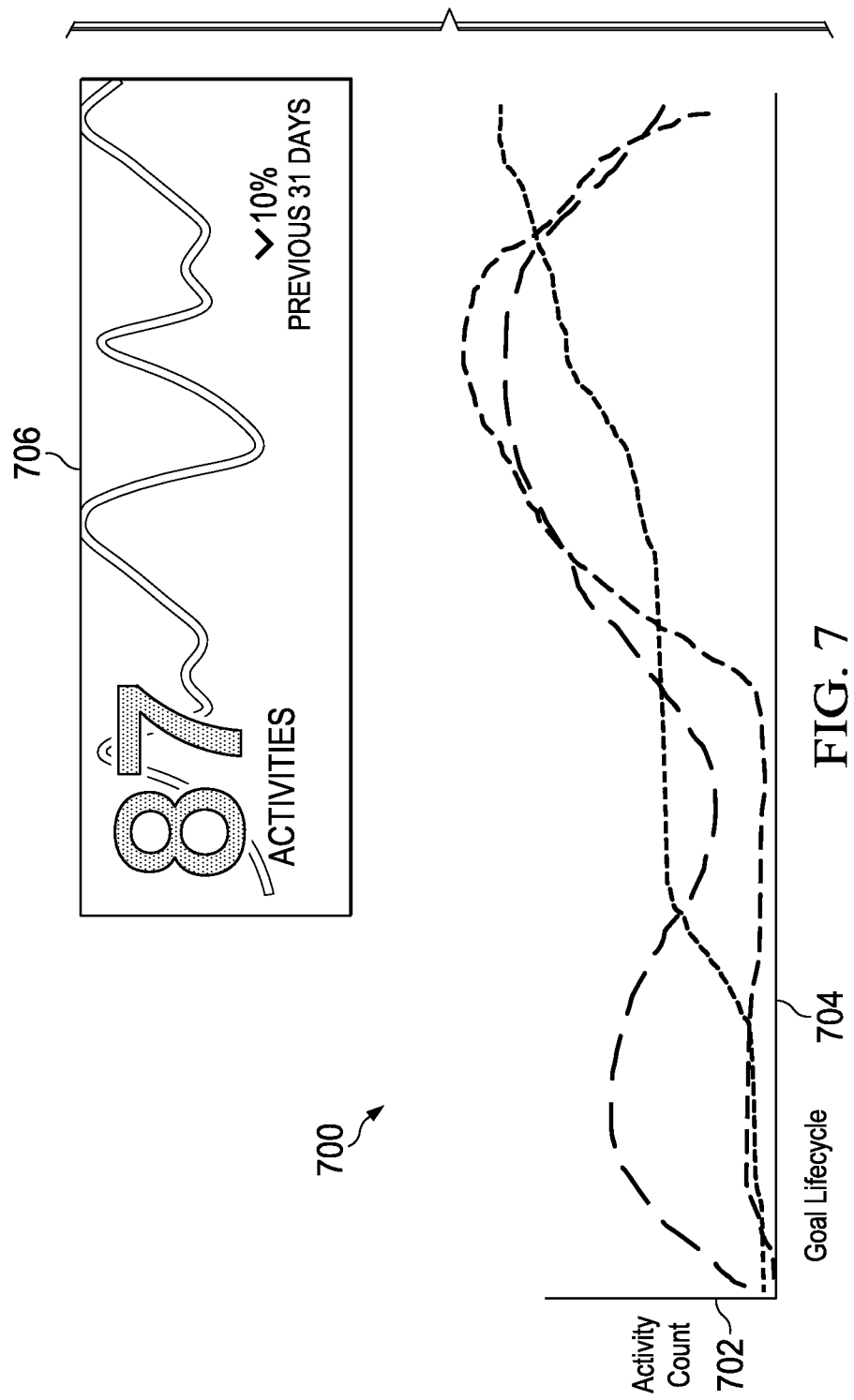
FIG. 7 is a graph illustrating an output of a resource tracking system, in accordance with an illustrative embodiment.

FIG. 7 is a graph illustrating an output of a resource tracking system, in accordance with an illustrative embodiment. Graph 700 may be an alternative to the graphical user interfaces shown in FIG. 2 through FIG. 6. Graph 700 may be displayed on a tangible display as a result of the output of a tracking system, as described above.

Graph 700 shows a graph of activity count 702 versus goal lifecycle 704. Each line shown in the graph shows a count of a type of activity over time. The various types of dashes show the various types of activities being tracked. In this manner, a user can easily see increasing or decreasing trends in activities over time for an individual person, for a team, for an entire organization, or perhaps for a set of selected individuals or for the activities of other software programs. Stated differently, graph 700 shows activity trends towards a selected goal and allows a user to identify where most time is spent throughout a life cycle of a goal for an individual, a team, an organization, or a selected number of individuals or the activities of other software programs.

In area 706 of the graphical user interface the number of activities and the graph of total activities over time may be displayed. A total percentage increase or decrease in activities over a selected time period may also be displayed in area 706.

Figure 8:
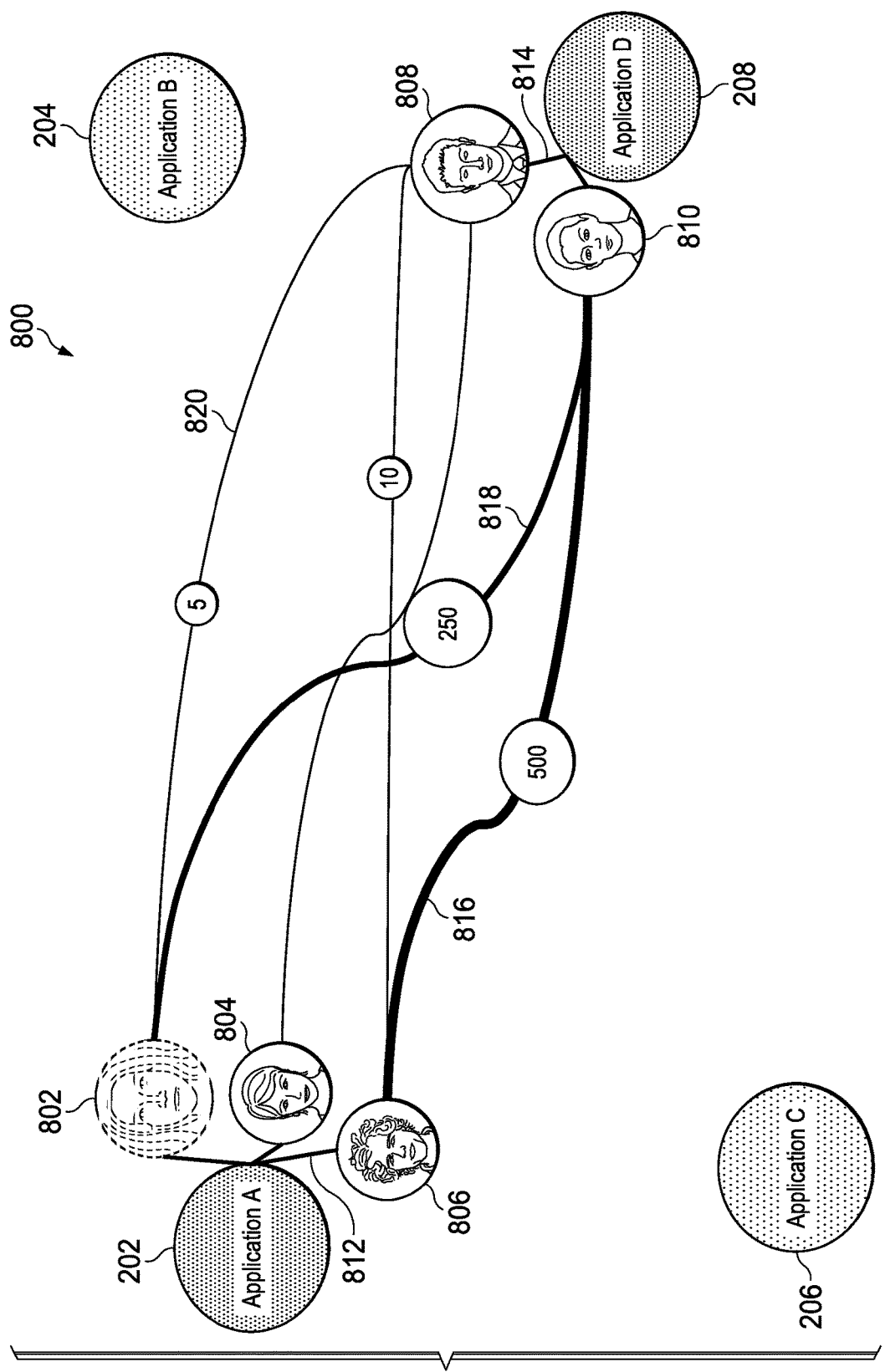
FIG. 8 is a relationship diagram illustrating an output of a resource tracking system, in accordance with an illustrative embodiment.

FIG. 8 is a relationship diagram illustrating an output of a resource tracking system, in accordance with an illustrative embodiment. Relationship graph 800 may be an alternative to the graphical user interfaces shown in FIG. 2 through FIG. 7. Relationship graph 800 may be displayed on a tangible display as a result of the output of a tracking system, as described above.

Relationship graph 800 shows that the tracker of the illustrative embodiments may bring together true visibility on cross-departmental work activities and common engagements. Relationship graph 800 also shows that the tracker of the illustrative embodiments may identify main collaborators across teams to identify strong connections between individuals and to identify work patterns.

The tracker of the illustrative embodiments allows a user to identify specific relationships among different applications and corresponding individuals, teams, or organizations that use those different applications. Use of an application may be considered an activity.

FIG. 8 shows the four applications described above, including application A 202, application B 204, application C 206, and application D 208. In addition, five users are shown. Three users are more commonly associated with application A 202, including user A 802, user B 804, and user C 806. Two users are more commonly associated with application D 208, including user D 808 and user E 810. Lines between an application and a user show which users are using which applications, such as line 812 or line 814. Lines between users show relationships among users, for example where one user is consulting with another via one or more of the applications shown, or, for example, where a user uses the result of an activity of another user. Examples of lines between users include line 816, line 818, and line 820, though other lines are shown. The lines between users may be colored, thickened, dashed, or otherwise marked to convey additional information. For example, line 816 is thickened and marked with the number five hundred to show a large number of connected activities between user C 806 and user E 810. In contrast, line 820 is thin and is marked with the number five to show a relatively small number of connected activities between User A 802 and User C 806.

Thus, in the specific example shown in FIG. 8, a user desires to see relationships among application A 202 and application D 208 and the users of those applications. Thus, to prevent relationship graph 800 from becoming cluttered, application C 206 and application B 204 are faded out and their connections and users are not displayed. Then several users of application A 202 are shown and several users of application D 208 are shown, along with the activity connections among those users. As described above, indicators such as line thickness, line color, or other information may be displayed to convey additional information. The additional information may be activity type, number of activities, a strength of the relationship among users, and possibly other information.

Figure 9:
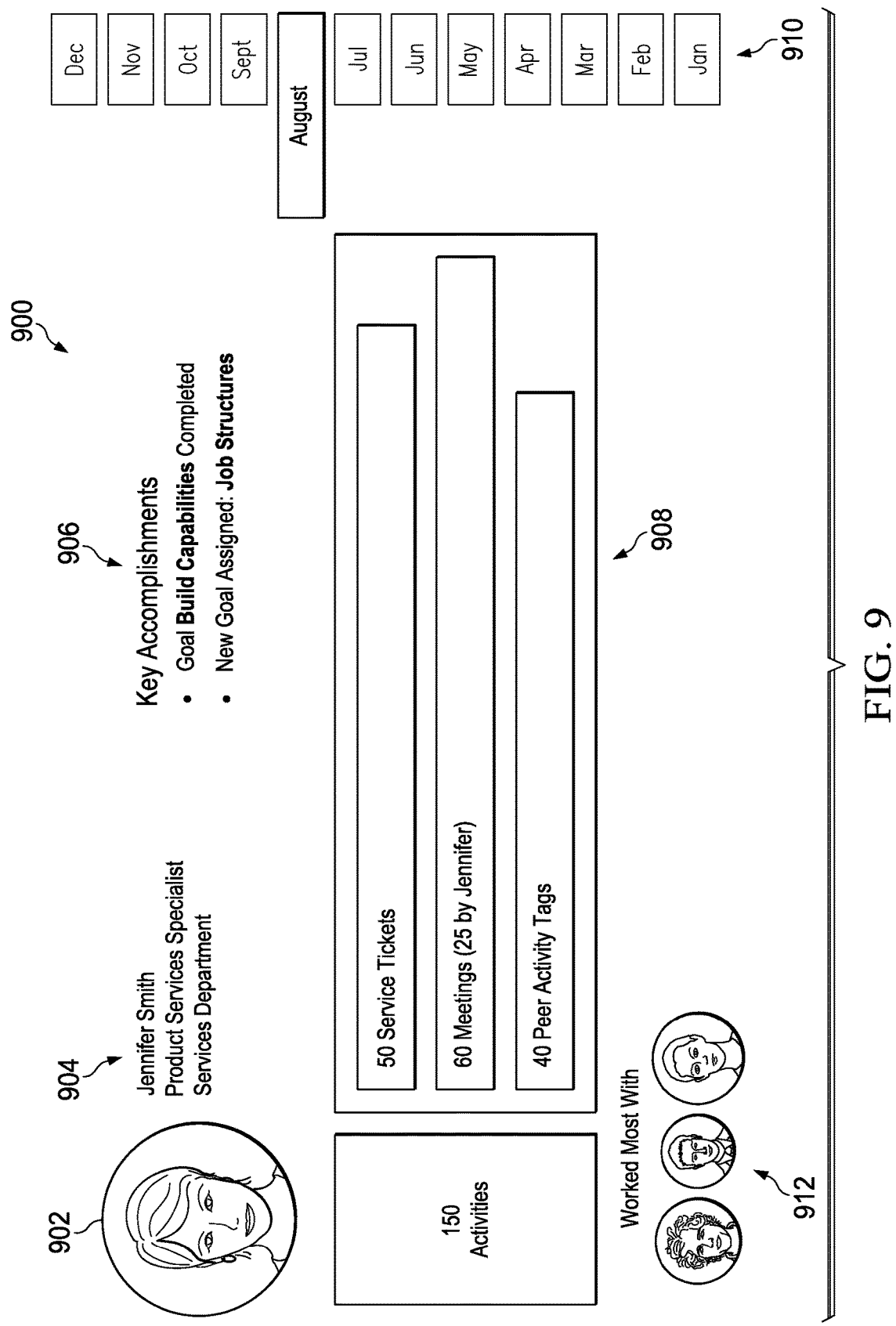
FIG. 9 is a status report output by a resource tracking system, in accordance with an illustrative embodiment.

FIG. 9 is a status report output by a resource tracking system, in accordance with an illustrative embodiment. Graphical user interface 900 shows that the tracker of the illustrative embodiments may cause a display of a summary of activities for an individual. Thus, graphical user interface 900 shows an alternative to the various graphical user interfaces and graphs shown in FIG. 2 through FIG. 8.

In the example of FIG. 9, the tracker of the illustrative embodiments has put together and caused display of a summary of the activities and relationships of an individual user, user X 902. The name, picture, and various information about user X 902 may be displayed in area 904, such as the job title and team or organization assignment. Key accomplishments, goals, or goals under consideration for assignment to user X 902 may be displayed in area 906. The number and types of activities performed by user X 902 may be shown in area 908. The information in area 908 may be color coded for easier recognition. The types of activities may be presented as a horizontal bar graph to quickly show the proportion of time used relative to other activities or perhaps the proportion of a given activity to the total number of activities.

Other information may be displayed. For example, in area 910 a timeline may be shown that also displays the time interval for which the reporting data is collated. In this particular example, the reporting period is the month of August, with other the other twelve months of the year shown faded to indicate that the information for these months is not currently displayed. The time interval could be changed to years, weeks, days, or even hours. In some cases, another menu may be provided so that the user may select the desired time interval for reporting.

In addition, graphical user interface 900 may include information regarding with which other persons User X 902 works. For example, area 912 may show the top three individuals with whom User X 902 works. More or fewer users may be displayed. Teams or organizations or customers could be displayed.

Thus, the illustrative embodiment of FIG. 9 is a specific example only and may be varied. For example, instead of showing the activities of a single person, information about a team or the whole organization may be displayed. Thus, for example, if a team is displayed, then total activities of the team and the three most worked with outside teams may be displayed. The number of "most worked with" people may be varied. The time period may be varied from "by month" to "by year" or "by week" or even "by day" or "by hour". More or less information may be displayed. The layout of the information shown in FIG. 9 may be varied. Thus, the illustrative embodiments are not necessarily limited to the example shown in FIG. 9.

Figure 10:
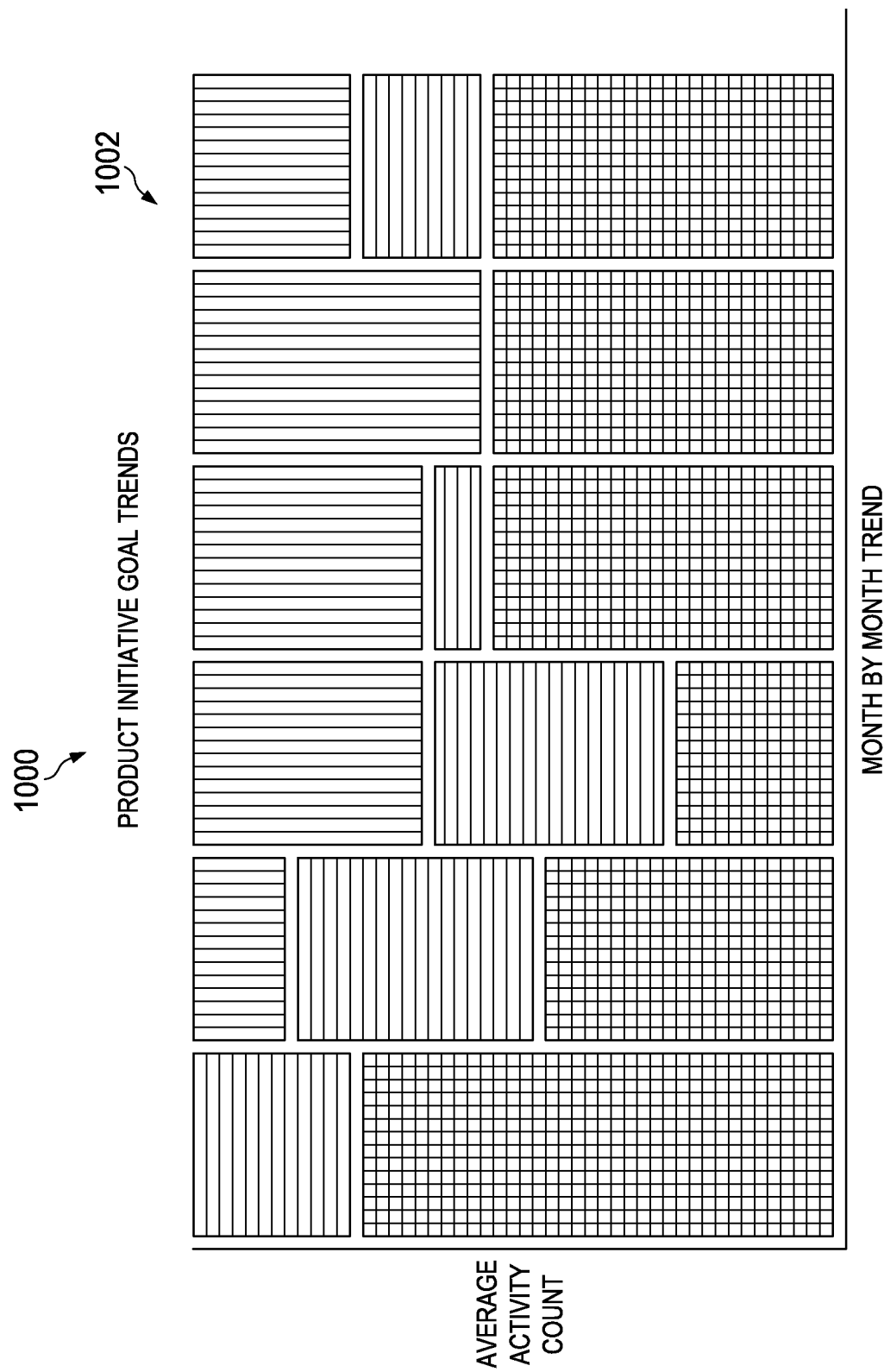
FIG. 10 is a bar graph report output by a resource tracking system, in accordance with an illustrative embodiment.

FIG. 10 is a bar graph report output by a resource tracking system, in accordance with an illustrative embodiment. Thus, graphical user interface 1000 shows an alternative to the various graphical user interfaces and graphs shown in FIG. 2 through FIG. 9. Graphical user interface 1000 shows that the tracker of the illustrative embodiments may cause a display of a summary of activities for an individual, team, or organization by activity count and by time interval. This summary may take the form of bar graph 1002.

Bar graph 1002 may display the average activity account on a month-by-month basis. Different time periods may be used. Bar graph 1002 also shows different sections within individual bars. Each bar has a total equal to every other bar, because the top of bar graph 1002 represents one hundred percent of activities for the given month. Different highlighted sections within an individual month shows a relative percentage of a given type of activity is performed for the given month. The coloring, hashing, or other highlighting indicates which activity is being indicated.

Thus, bar graph 1002 aggregates and presents patterns in work towards similar goals. Bar graph 1002 also shows product initiative goal trends.

The illustrative embodiment of FIG. 10 may be further varied. More or different information may be presented. The time periods may be varied, and more or fewer activity types may be present. Different types of highlighting are possible. The layout or look and feel of bar graph 1002 may change. Thus, the illustrative embodiments are not necessarily limited to the specific examples shown in FIG. 10.

Figure 11:
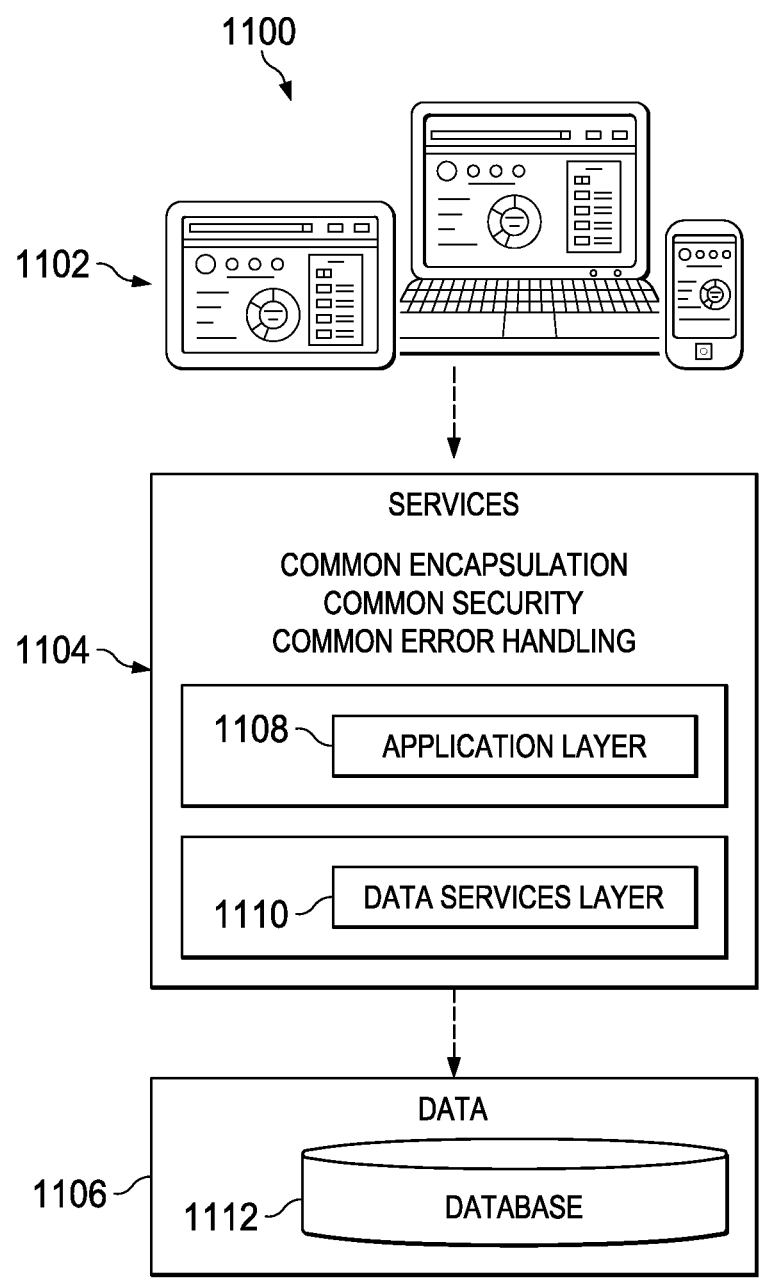
FIG. 11 is a block diagram of an architecture of a resource tracking system, in accordance with an illustrative embodiment.
Figure 12:
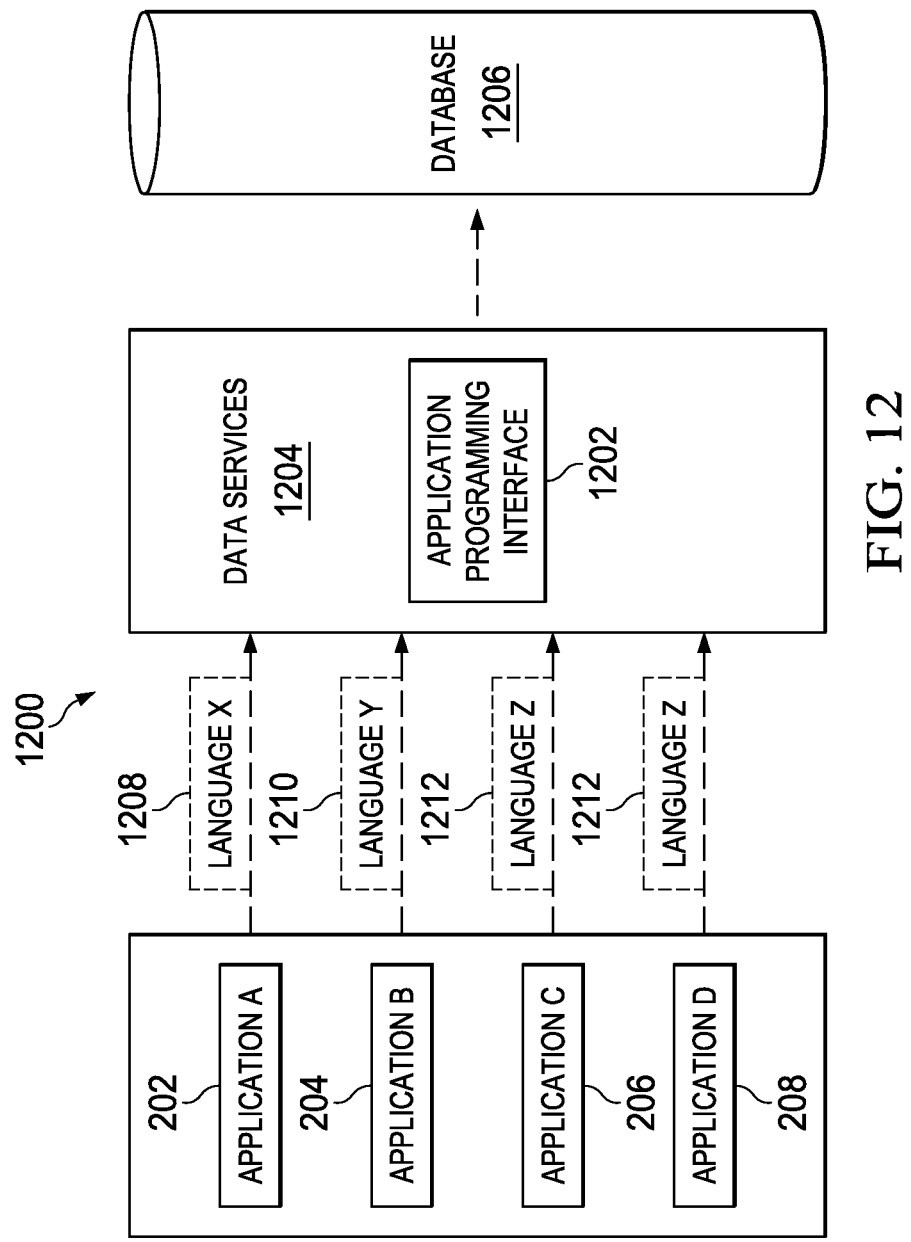
FIG. 12 is a block diagram illustrating details of the resource tracking system architecture shown in FIG. 11, in accordance with an illustrative embodiment.

Attention is now turned to examples of how to implement the tracker of the illustrative embodiments. These illustrative embodiments are exemplary and may be varied. FIG. 11 shows the overall architecture, FIG. 12 shows the details of the tracking system, and FIG. 13 is an exemplary application programming interface (API).

FIG. 11 is a block diagram of an architecture of a resource tracking system, in accordance with an illustrative embodiment. Tracking system architecture 1100 may be implemented using hardware, such as computing system 1600 of FIG. 16 or data processing system 1800 of FIG. 18, possibly in the context of a network or cloud operating environment such as cloud computing environment 1700 of FIG. 17. Tracking system architecture 1100 may also be implemented in the form of software or program code stored on a non-transitory computer readable storage medium which, when executed, improves the efficiency of the overall network or the server by more efficiently gathering and presenting desired data.

Tracking system architecture 1100 includes client layer 1102, services layer 1104, and data layer 1106. Each of client layer 1102, services layer 1104, and data layer 1106 may be implemented as described above for tracking system architecture 1100. Each layer communicates only with the immediately preceding and immediately succeeding layer, although in some illustrative embodiments a client in client layer 1102 may communicate directly with servers or non-transitory computer readable storage media in data layer 1106.

Client layer 1102 includes one or more client systems. A client system may be a computer, an application, or a third party request through some other computer. Thus, a client system may be a requesting computer or program communicating through a cloud environment. The various graphical user interfaces described with respect to FIG. 2 through FIG. 10 may be shown on tangible display devices of the client's systems in client layer 1102. Client layer 1102 communicates through one or more communication channels with services layer 1104.

Services layer 1104 provides for common encapsulation, common security, and common error handling with respect to requests and data reception from client layer 1102. Services layer 1104 may include application layer 1108 and data services layer 1110. Details regarding services layer 1104, application layer 1108, and data services layer 1110 are described with respect to FIG. 12. However, in general, application layer 1108 handles requests for applications and data services layer 1110 handles application programming interfaces for building requests to data layer 1106.

Data layer 1106, in turn, includes one or more databases, such as database 1112. One or more of these databases may be stored on an individual non-transitory computer readable storage medium. These databases may contain the underlying information which is consumed and then returned to the clients in client layer 1102 in order to present the graphical user interfaces shown in FIG. 2 through FIG. 10. Thus, tracking system architecture 1100 is a service oriented architecture which is highly scalable and which provides multi-device support.

FIG. 12 is a block diagram illustrating details of the resource tracking system architecture shown in FIG. 11, in accordance with an illustrative embodiment. Specifically, services layer 1200 is an example of services layer 1104 of FIG. 11. Reference numerals common to FIG. 2 have common descriptions.

In an illustrative embodiment, data requests (either from a push or a pull) are transmitted back and forth from applications, such as application A 202, application B 204, application C 206, and application D 208. These requests are then received by one or more application programming interfaces (APIs), such as application programming interface 1202 within data services 1204, to build a request of database 1206 (which may be in data layer 1106 of FIG. 11). These application programming interfaces may be built using one or more languages, such as language X 1208, language Y 1210, or language Z 1212, depending on the author of the corresponding application.

Thus, the illustrative embodiments may use information taken from third party applications of a variety of proprietary formats and still present a coherent set of information to the user, as shown in FIG. 2 through FIG. 10. Additionally, the architecture is scalable as more or different programs may be provided to the tracking system, which then, accordingly, updates subsequent reports shown to the user.

In a specific illustrative embodiment, the tracking system of the illustrative embodiments may be backed by a REST-JSON API, written in Ruby on Rails version 4. Other languages or other APIs may be used in other illustrative embodiments. The API is then is used to import data from the organization which is responsible for the tracker of the illustrative embodiments (and any third party APIs) and to serve the front end of the tracking system. In a specific illustrative embodiment, the development environment may be the RubyMine integrated development environment using the railsAPI gem. However, other development environments are possible.

Any given API used with the tracking system of the illustrative embodiments may include three models: work item, tag, and person. Each model has an endpoint. In an illustrative embodiment there is a many-to-many relationship between these models. The models inherit from Active Record the object relational mapping built into Rails, which comes preconfigured with sqlite3 for development. The controllers may support five actions: index, show, create, update, and destroy. The resources are automatically routed, including nested resources.

FIG. 13 is an example of an application programming interface usable in a resource tracking system, in accordance with an illustrative embodiment. Application programming interface 1300 may be an example of one or more of the application programming interfaces used to implement the tracker of the illustrative embodiments, as described with respect to FIG. 12. The pseudo-code shown in FIG. 13, which implements application programming interface 1300, is exemplary only and may be varied.

As described above, each application programming interface includes three models: work item, tag, and person. The work item model is shown in lines three through ten in FIG. 13, which is code to describe which application is being accessed or used and what information is to be taken from the underlying database.

The tag model is shown in lines eleven through fifteen in FIG. 13. Although only one tag is shown, more or fewer tags may be present. Tags are basic words or phrases that are commonly used as reference points when describing an element of value or clarification on an associated object. Tags can be linked to meta-data elements within a platform. While tags can theoretically be linked to any data model objects, the following objects may be supported in a particular example: global person, position, organization unit, job family, capability and asset. Tags may be used to analyze trends across different applications and platforms, or to otherwise assist in collating desired information.

The person model is shown in lines 16 through 22 of FIG. 13. The person model provides one or more forms of identification of the person involved in the requested data. More or fewer people could be present. More or fewer forms of identification may be present. In the illustrative embodiment shown in FIG. 13, a single person is described by three identifiers: first name, last name, and email address. The application programming interface then uses this person's information as part of determining what information to retrieve and then present to the user in a graphical user interface, such as shown in FIG. 2 through FIG. 10.

Figure 14:
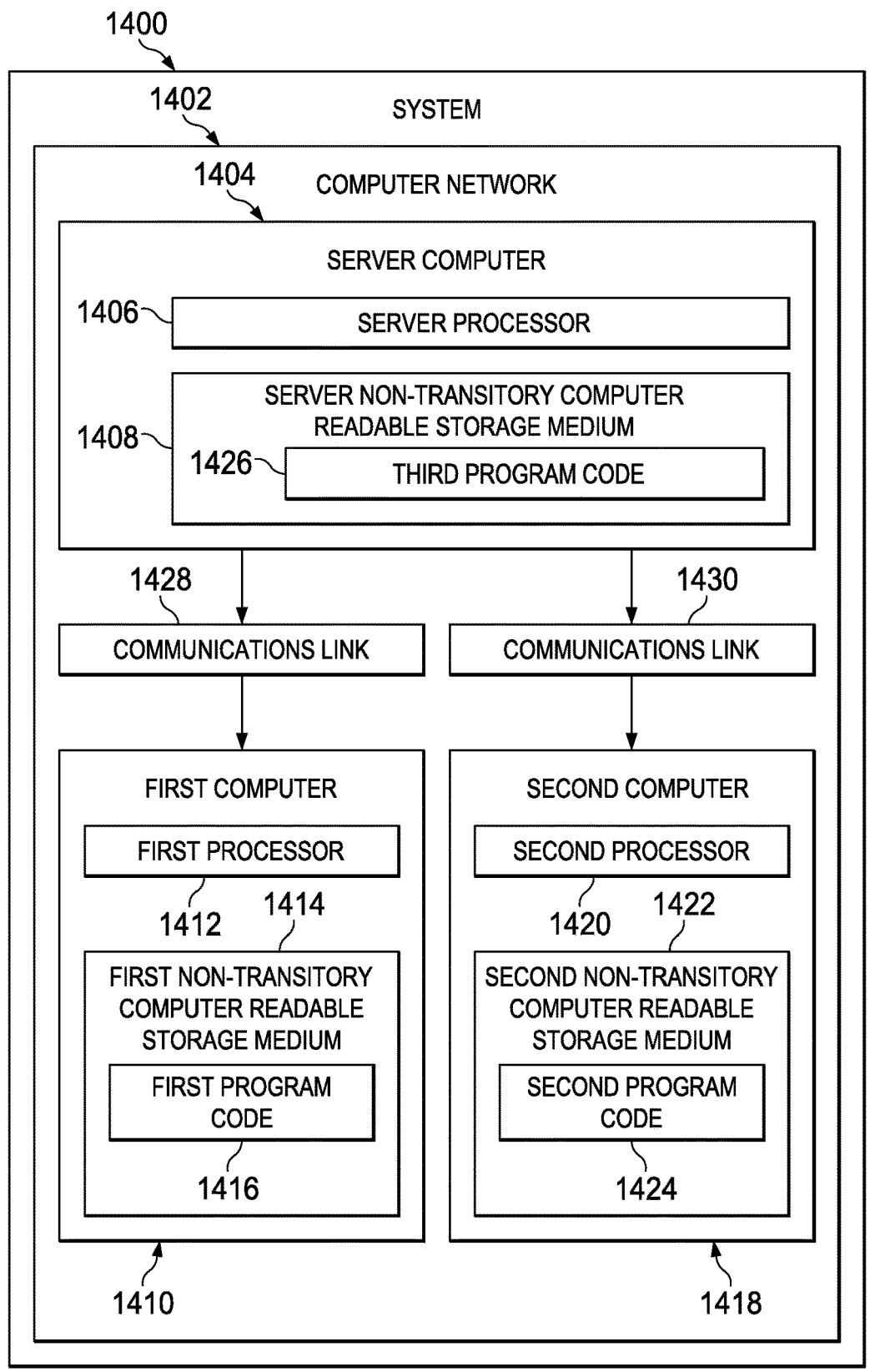
FIG. 14 is a block diagram of a resource tracking system, in accordance with an illustrative embodiment.

FIG. 14 is a block diagram of a resource tracking system, in accordance with an illustrative embodiment. System 1400 is implemented as a data processing system, such as computing system 1600 of FIG. 16 or data processing system 1800 of FIG. 18. System 1400 may implement a variation of the techniques described with respect to FIG. 1 through FIG. 13. System 1400 may be described as a computer; however, in the context of FIG. 14 the term "system", including system 1400, may refer to any processor, application specific integrated circuit, application specific processor, or any other tangible physical hardware operating in conjunction with a tangible physical display, tangible physical input devices, and a non-transitory computer readable storage medium.

Thus, system 1400 may include computer network 1402. Computer network 1402 may include server computer 1404 having server processor 1406 and server non-transitory computer readable storage medium 1408. Computer network 1402 may be part of, or constitute, a cloud environment, such as cloud computing environment 1700 of FIG. 17.

Computer network 1402 may also include first computer 1410. First computer 1410 may be in communication with the server computer and may be operable by a first user. First computer 1410 has first processor 1412 and first non-transitory computer readable storage medium 1414 storing first program code 1416. First program code 1416, when executed by the first processor, implements a first software tool having a first function and a second software tool having a second function.

Computer network 1402 may also include second computer 1418 in communication with the server computer operable by a second user. Second computer 1418 has second processor 1420 and second non-transitory computer readable storage medium 1422 storing second program code 1424. Second program code 1424, when executed by the second processor, implements the first software tool having the first function and the second software tool having the second function.

Server non-transitory computer readable storage medium 1408 stores third program code 1426. Third program code 1426, when executed by server processor 1406, is configured to perform a number of functions. The functions include gathering first data regarding use of the first software tool and gathering second data regarding use of the second software tool. The functions also include, based on the first data and the second data, linking activities of the first user and the second user to a performance goal for any one of the first user, the second user, a team including at least the first user or the second user, or an organization to which the first user and the second user belong. In executing third program code 1426, communications link 1428 or 1430 between the server computer and the first computer 1410 or second computer 1418 is improved.

The illustrative embodiments described with respect to FIG. 14 may be varied. For example, in an illustrative embodiment, third program code 1426 may be further configured to cause a physical display device to present proportional use information comprising a proportional comparison of: use of the first software tool on both the first computer and the second computer relative to use of the second software tool on both the first computer and the second computer.

In another illustrative embodiment, third program code 1426 may be further configured to: based on the first data and the second data, calculate a first amount of work the first user contributed to the performance goal and calculate a second amount of work the second user contributed to the performance goal. In another illustrative embodiment, third program code 1426 may be further configured to, based on the first data and the second data, calculate a performance of the first user relative to the second user.

In another illustrative embodiment, the first user has a first assigned goal. In this case, third program code 1426 may be further configured to track a total number of activities by the first user for the first assigned goal.

In still another illustrative embodiment, third program code 1426 may be further configured to calculate, for the first user, a proportional use of the first software tool and the second software tool. In this case, third program code 1426 may be further configured to display which of the first user and the second user performs a most number of particular activities towards the performance goal. In this manner, it may be determined which user should be consulted regarding a question regarding the particular activities.

In yet another illustrative embodiment, the performance goal is for the organization. The organization has a plurality of departments and the first user is in a first department and the second user is in a second department. In this case, third program code 1426 may be further configured to, based on the first data and the second data, display cross-departmental collaboration between the first user and the second user.

In still another illustrative embodiment, any of the examples described above with respect to FIG. 14 may be described with respect to server computer 1404 itself. Thus, the claimed illustrative embodiments are not necessarily limited to computer network 1402, but also may be characterized as server computer 1404 configured to receive information from first computer 1410 and second computer 1418 as described above.

Other variations are possible. Thus, the claimed illustrative embodiments are not necessarily limited by the examples described with respect to FIG. 14.

Figure 15:
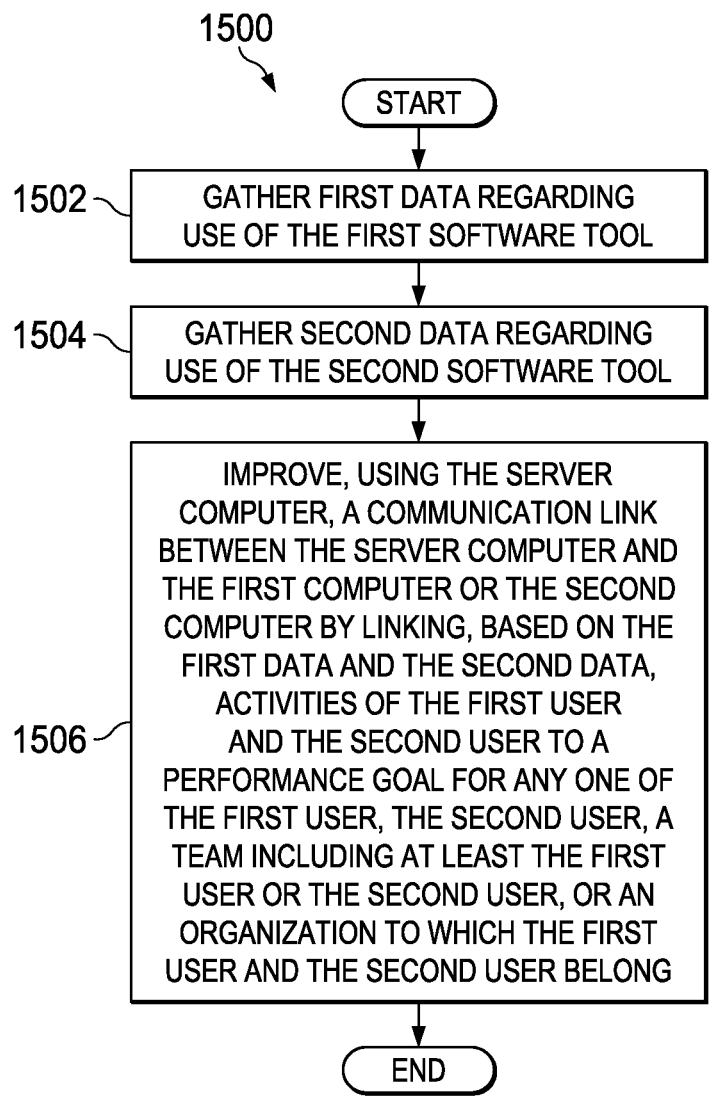
FIG. 15 is a flowchart of a method for performing resource tracking, in accordance with an illustrative embodiment.

FIG. 15 is a flowchart of a method for performing resource tracking, in accordance with an illustrative embodiment. Method 1500 is implemented using a data processing system, such computing system 1600 of FIG. 16 or data processing system 1800 of FIG. 18. Method 1500 may be implemented in a cloud environment, such as cloud computing environment 1700 of FIG. 17. Method 1500 may be a variation of the techniques described with respect to FIG. 1 through FIG. 14. The various operations described with respect to method 1500 are described as being performed by a computer; however, in the context of FIG. 15 the term "computer" may refer to any processor, application specific integrated circuit, application specific processor, or any other tangible physical hardware operating in conjunction with a tangible physical display, tangible physical input devices, and a non-transitory computer readable storage medium.

Method 1500 may be implemented in a server computer having a server processor and a server non-transitory computer readable storage medium. The server computer may be in communication with a first computer, operable by a first user. The first computer may have a first processor and a first non-transitory computer readable storage medium storing first program code. The first program code, when executed by the first processor, implements a first software tool having a first function and a second software tool having a second function. The server computer may be in communication with a second computer, operable by a second user. The second computer may have a second processor and a second non-transitory computer readable storage medium storing second program code. The second program code, when executed by the second processor, implements the first software tool having the first function and the second software tool having the second function. The server non-transitory computer readable storage medium stores third program code. The third program code, when executed by the server processor, implements method 1500.

Method 1500 may include gathering first data regarding use of the first software tool (operation 1502). Method 1500 may also include gathering second data regarding use of the second software tool (operation 1504).

Method 1500 may also include improving, using the server computer, a communications link between the server computer and the first computer or the second computer by linking, based on the first data and the second data, activities of the first user and the second user to a performance goal for any one of the first user, the second user, a team including at least the first user or the second user, or an organization to which the first user and the second user belong (operation 1506). The process may terminate thereafter.

Method 1500 may be further varied. For example, method 1500 may also include altering a physical display device by displaying proportional use information comprising a proportional comparison of: use of the first software tool on both the first computer and the second computer relative to use of the second software tool on both the first computer and the second computer.

In another example, method 1500 may also include calculating, based on the first data and the second data, a first amount of work the first user contributed to the performance goal and calculating a second amount of work the second user contributed to the performance goal, and altering a physical display device by displaying the first amount of work and the second amount of work.

In another example, method 1500 may also include calculating, for the first user, a proportional use of the first software tool and the second software tool, and altering a physical display device by displaying which of the first user and the second user performs a most number of particular activities towards the performance goal.

Thus, the illustrative embodiments described with respect to FIG. 15 are exemplary only and do not necessarily limit the claimed illustrative embodiments. Further variations of method 1500 are possible, such as other techniques described with respect to FIG. 1 through FIG. 14.

Figure 16:
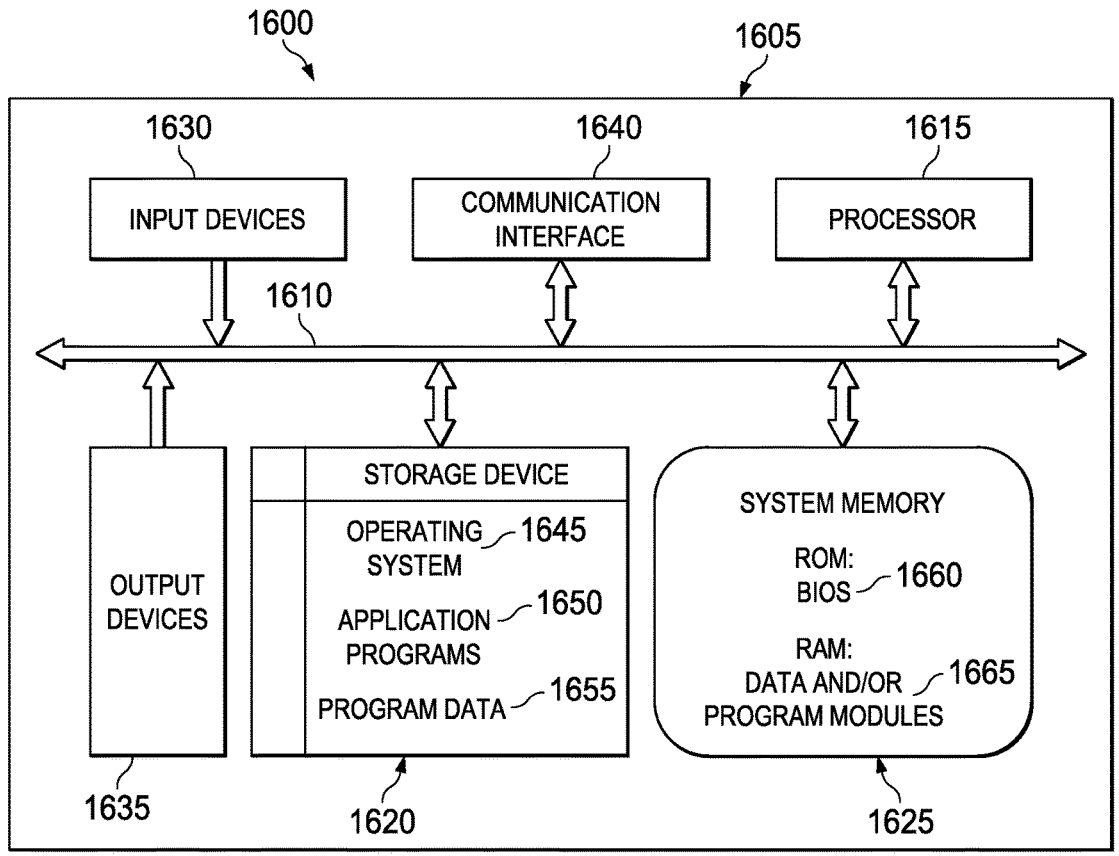
FIG. 16 is a block diagram of a data processing system, in accordance with an illustrative embodiment.

FIG. 16 is a block diagram of a data processing system, in accordance with an illustrative embodiment. FIG. 16 is an illustrative architecture of a computing system 1600 implemented as embodiments of the present illustrative embodiment. The computing system 1600 is only one example of a suitable computing system and is not intended to suggest any limitation as to the scope of use or functionality of the illustrative embodiment. Also, computing system 1600 should not be interpreted as having any dependency or requirement relating to any one or combination of components illustrated in computing system 1600.

As shown in FIG. 16, computing system 1600 includes a computing device 1605. The computing device 1605 can be resident on a network infrastructure such as within a cloud environment, or may be a separate independent computing device (e.g., a computing device of a third party service provider). The computing device 1605 may include a bus 1610, a processor 1615, a storage device in storage devices 1620, a system memory (hardware device) 1625, one or more input devices 1630, one or more output devices 1635, and a communication interface 1640.

The bus 1610 permits communication among the components of computing device 1605. For example, bus 1610 may be any of several types of bus structures including a memory bus or memory controller, a peripheral bus, or a local bus using any of a variety of bus architectures to provide one or more wired or wireless communications links or paths for transferring data and/or power to, from, or between various other components of computing device 1605.

The processor 1615 may be one or more conventional processors or microprocessors that include any processing circuitry operative to interpret and execute computer readable program instructions, such as program instructions for controlling the operation and performance of one or more of the various other components of computing device 1605. In embodiments, processor 1615 interprets and executes the processes, steps, functions, and/or operations of the present illustrative embodiment, which may be operatively implemented by the computer readable program instructions. For example, the processor 1615 implements the processes as described throughout including the examples herein. In embodiments, the processor 1615 integrates multiple systems and applications together, and determines trends by analyzing tags and/or keywords of one or more users over the multiple integrated systems and applications.

In other embodiments, processor 1615 may receive input signals from one or more input devices 1630 and/or drive output signals through one or more output devices 1635. The input devices 1630 may be, for example, a keyboard or touch sensitive user interface (UI) as further described below. The output devices 1635 can be, for example, any display device, printer, etc., as further described below.

The storage device in storage devices 1620 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 1605 in accordance with the different aspects of the present illustrative embodiment. In other embodiments, storage device in storage devices 1620 may store operating system 1645, application programs 1650, and program data 1655 in accordance with aspects of the present illustrative embodiment.

The system memory 1625 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 1660 (BIOS) including the basic routines that help to transfer information between the various other components of computing device 1605, such as during start-up, may be stored in the ROM. Additionally, data and/or program modules 1665, such as at least a portion of operating system 1645, application programs 1650, and/or program data 1655, that are accessible to and/or presently being operated on by processor 1615 may be contained in the RAM.

The one or more input devices 1630 may include one or more mechanisms that permit an operator to input information to computing device 1605, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 1635 may include one or more mechanisms that output information to an operator, such as, but not limited to, audio speakers, headphones, audio line-outs, visual displays, antennas, infrared ports, tactile feedback, printers, or combinations thereof.

The communication interface 1640 may include any transceiver-like mechanism (e.g., a network interface, a network adapter, a modem, or combinations thereof) that enables computing device 1605 to communicate with remote devices or systems, such as a mobile device or other computing devices such as, for example, a server in a networked environment, e.g., cloud environment. For example, computing device 1605 may be connected to remote devices or systems via one or more local area networks (LAN) and/or one or more wide area networks (WAN) using communication interface 1640.

As discussed herein, computing system 1600 may be configured to implement the processes as described throughout including the functionality and examples herein, as shown in the figures attached herein including the underlying functionality of the screen displays as described herein, in addition to the process flows and the illustrative examples. That is, amongst many different aspects described herein, the computing system 1600 is an integrated resource tracking system and, more particularly, provides processes and systems to integrate multiple systems and applications together to determine trends by analyzing tags and/or keywords of multiple users over the multiple integrated systems and applications.

In particular, computing device 1605 may perform tasks (e.g., process, steps, methods and/or functionality) in response to processor 1615 executing program instructions contained in a computer readable medium, such as system memory 1625. The program instructions may be read into system memory 1625 from another computer readable medium, such as a data storage device in data storage devices 1620, or from another device via the communication interface 1640 or server within or outside of a cloud environment. In embodiments, an operator may interact with computing device 1605 via the one or more input devices 1630 and/or the one or more output devices 1635 to facilitate performance of the tasks and/or realize the end results of such tasks in accordance with aspects of the present illustrative embodiment. In additional or alternative embodiments, hardwired circuitry may be used in place of or in combination with the program instructions to implement the tasks, e.g., steps, methods and/or functionality, consistent with the different aspects of the present illustrative embodiment. Thus, the steps, methods, and/or functionality disclosed herein can be implemented in any combination of hardware circuitry and software.

Figure 17:
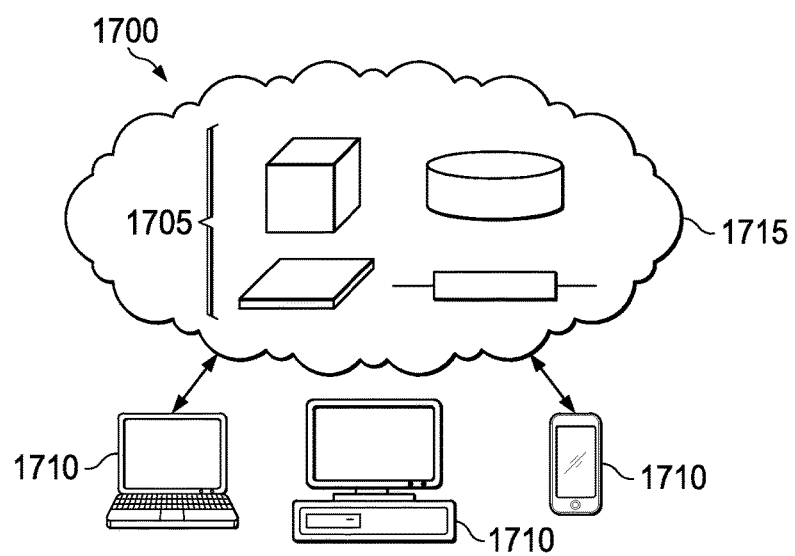
FIG. 17 is a block diagram of a cloud environment, in accordance with an illustrative embodiment.

FIG. 17 is a block diagram of a cloud environment, in accordance with an illustrative embodiment. FIG. 17 shows an exemplary cloud computing environment 1700. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions, and/or processes described herein may be performed and/or provided via cloud computing environment 1700.

As depicted in FIG. 17, cloud computing environment 1700 includes cloud resources 1705 that are made available to client devices 1710 via a network 1715, such as the Internet. Cloud resources 1705 can include a variety of hardware and/or software computing resources, such as servers, databases, storage, networks, applications, and platforms. In embodiments, the systems and processes herein can be integrated into the cloud resources in order to provide tracking and trending capabilities as described and shown herein.

Cloud resources 1705 may be on a single network or a distributed network. Cloud resources 1705 may be distributed across multiple cloud computing systems and/or individual network enabled computing devices. Client devices 1710 may comprise any suitable type of network-enabled computing device, such as servers, desktop computers, laptop computers, handheld computers (e.g., smartphones, tablet computers), set top boxes, and network enabled hard drives. Cloud resources 1705 are typically provided and maintained by a service provider so that a client does not need to maintain resources on a local implementation of client device 1710. In embodiments, cloud resources 1705 may include one or more computing system 1600 of FIG. 16 that is specifically adapted to perform one or more of the functions and/or processes described herein.

Cloud computing environment 1700 may be configured such that cloud resources 1705 provide computing resources to client devices 1710 through a variety of service models, such as Software as a Service (SaaS), Platforms as a service (PaaS), Infrastructure as a Service (IaaS), and/or any other cloud service models. Cloud resources 1705 may be configured, in some cases, to provide multiple service models to a client device 1710. For example, cloud resources 1705 can provide both SaaS and IaaS to a client device 1710. Cloud resources 1705 may be configured, in some cases, to provide different service models to different types of client devices 1710. For example, cloud resources 1705 can provide SaaS to a first type of client device 1710 and PaaS to a second type of client device 1710.

Cloud computing environment 1700 may be configured such that cloud resources 1705 provide computing resources to client devices 1710 through a variety of deployment models, such as public, private, community, hybrid, and/or any other cloud deployment model. Cloud resources 1705 may be configured, in some cases, to support multiple deployment models. For example, cloud resources 1705 can provide one set of computing resources through a public deployment model and another set of computing resources through a private deployment model.

One or more of cloud resources 1705 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and may provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources in cloud resources 1705 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions, and/or processes described herein may be accessed and/or utilized by a client (e.g., an enterprise or an end user) as one or more of an SaaS, PaaS, and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 1705 may be configured to provide a variety of functionality that involves user interaction. Accordingly, a user interface (UI) can be provided for communicating with cloud resources 1705 and/or performing tasks associated with cloud resources 1705. The UI can be accessed via a client device 1710 in communication with cloud resources 1705. The UI can be configured to operate in a variety of client modes, including a fat client mode, a thin client mode, or a hybrid client mode, depending on the storage and processing capabilities of cloud resources 1705 and/or client device 1710. Therefore, a UI can be implemented as a standalone application operating at the client device in some embodiments. In other embodiments, a web browser-based portal can be used to provide the UI. Any other configuration to access cloud resources 1705 can also be used in various implementations.

The technical solutions provided herein include the integration of many different systems/applicants and the providing of an analysis of tags/keywords, etc. to determine trending information, amongst other things. The technical solutions are implemented in the computer infrastructure of FIG. 16 and/or the environment of FIG. 17, and can be integrated in many different systems described herein. The following examples, amongst all of the functionality and examples herein, can include a computer program product which includes computer readable program instructions stored on computer readable storage medium (or media) for implementing any of the combinations of processes and systems herein. The computer readable storage medium include the one or more storage medium as described with regard to FIG. 16, e.g., non-transitory media, a tangible device, etc. The method, and/or computer program product implementing the flows or examples provided herein can be downloaded to respective computing/processing devices, e.g., computing system of FIG. 16 as already described herein, or implemented on a cloud infrastructure as described with regard to FIG. 17. Accordingly, the processes associated with each flow of the present illustrative embodiment can be implemented by special purpose hardware-based systems that perform the specified functions or acts or carry out combinations of special purpose hardware and computer instructions.

Figure 18:
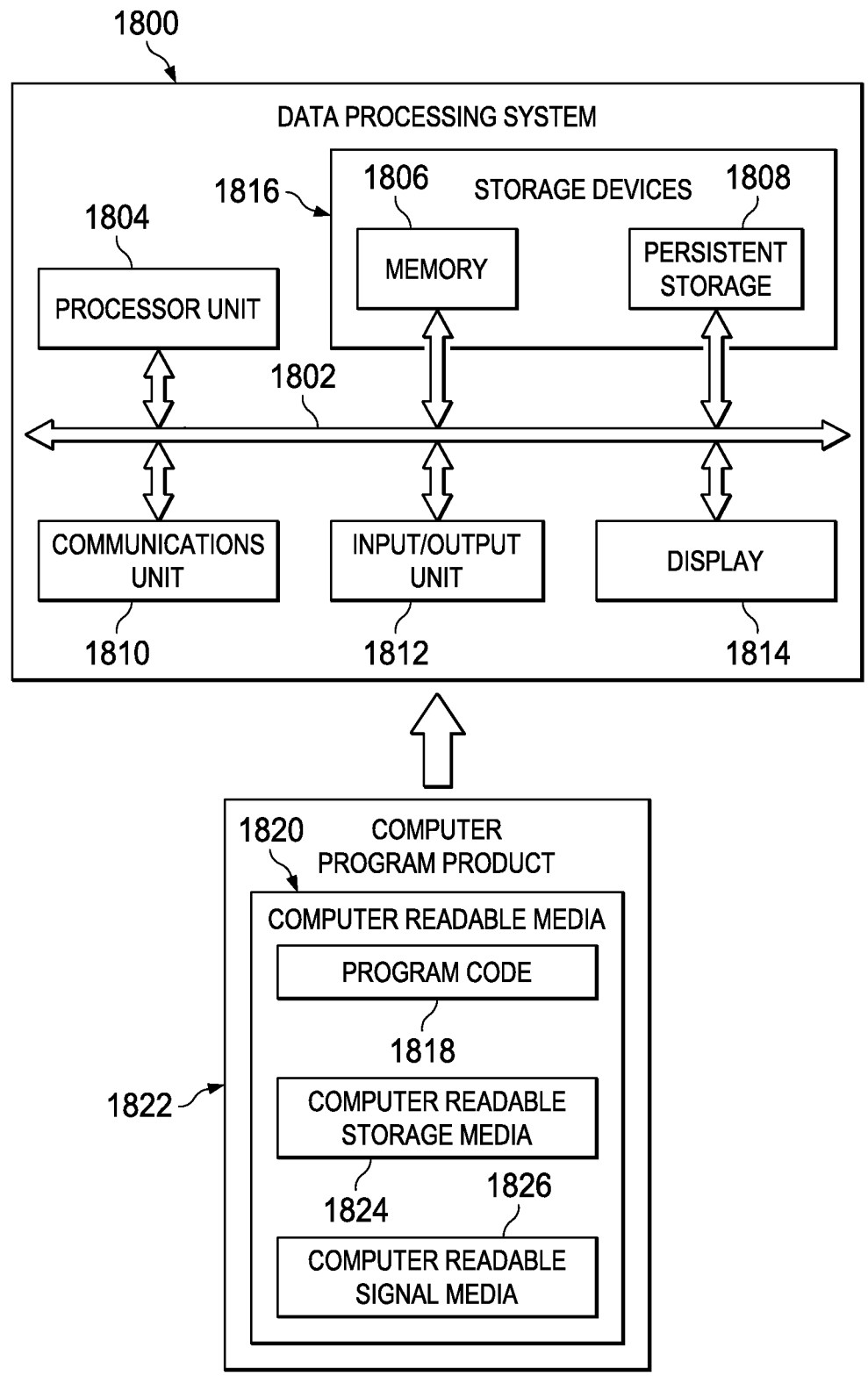
FIG. 18 is a block diagram of a data processing system, in accordance with an illustrative embodiment.

Turning now to FIG. 18, an illustration of a data processing system is depicted in accordance with an illustrative embodiment. Data processing system 1800 in FIG. 18 is an example of a data processing system that may be used to implement the illustrative embodiments, such as those described with respect to FIG. 1 through FIG. 15. In this illustrative example, data processing system 1800 includes communications fabric 1802, which provides communications between processor unit 1804, memory 1806, persistent storage 1808, communications unit 1810, input/output (I/O) unit 1812, and display 1814.

Processor unit 1804 serves to execute instructions for software that may be loaded into memory 1806. This software may be an associative memory, content addressable memory, or software for implementing the processes described elsewhere herein. Processor unit 1804 may be a number of processors, a multi-processor core, or some other type of processor, depending on the particular implementation. A number, as used herein with reference to an item, means one or more items. Further, processor unit 1804 may be implemented using a number of heterogeneous processor systems in which a main processor is present with secondary processors on a single chip. As another illustrative example, processor unit 1804 may be a symmetric multi-processor system containing multiple processors of the same type.

Memory 1806 and persistent storage 1808 are examples of storage devices 1816. A storage device is any piece of hardware that is capable of storing information, such as, for example, without limitation, data, program code in functional form, and/or other suitable information either on a temporary basis and/or a permanent basis. Storage devices 1816 may also be referred to as computer readable storage devices in these examples. Memory 1806, in these examples, may be, for example, a random access memory or any other suitable volatile or non-volatile storage device. Persistent storage 1808 may take various forms, depending on the particular implementation.

For example, persistent storage 1808 may contain one or more components or devices. For example, persistent storage 1808 may be a hard drive, a flash memory, a rewritable optical disk, a rewritable magnetic tape, or some combination of the above. The media used by persistent storage 1808 also may be removable. For example, a removable hard drive may be used for persistent storage 1808.

Communications unit 1810, in these examples, provides for communicating with other data processing systems or devices. In these examples, communications unit 1810 is a network interface card. Communications unit 1810 may provide communications through the use of physical and/or wireless communications links.

Input/output (I/O) unit 1812 allows for input and output of data to and from other devices that may be connected to data processing system 1800. For example, input/output (I/O) unit 1812 may provide a connection for user input through a keyboard, a mouse, and/or some other suitable input device. Further, input/output (I/O) unit 1812 may send output to a printer. Display 1814 provides a mechanism to display information to a user.

Instructions for the operating system, applications, and/or programs may be located in storage devices 1816, which are in communication with processor unit 1804 through communications fabric 1802. In these illustrative examples, the instructions are in a functional form on persistent storage 1808. These instructions may be loaded into memory 1806 for execution by processor unit 1804. The processes of the different embodiments may be performed by processor unit 1804 using computer implemented instructions, which may be located in a memory, such as memory 1806.

These instructions are referred to as program code, computer usable program code, or computer readable program code that may be read and executed by a processor in processor unit 1804. The program code in the different embodiments may be embodied on different physical or computer readable storage media, such as memory 1806 or persistent storage 1808.

Program code 1818 is located in a functional form on computer readable media 1820 that is selectively removable and may be loaded onto or transferred to data processing system 1800 for execution by processor unit 1804. Program code 1818 and computer readable media 1820 form computer program product 1822 in these examples. In one example, computer readable media 1820 may be computer readable storage media 1824 or computer readable signal media 1826. Computer readable storage media 1824 may include, for example, an optical or magnetic disk that is inserted or placed into a drive or other device that is part of persistent storage 1808 for transfer onto a storage device, such as a hard drive, that is part of persistent storage 1808. Computer readable storage media 1824 also may take the form of a persistent storage, such as a hard drive, a thumb drive, or a flash memory, that is connected to data processing system 1800. In some instances, computer readable storage media 1824 may not be removable from data processing system 1800.

Alternatively, program code 1818 may be transferred to data processing system 1800 using computer readable signal media 1826. Computer readable signal media 1826 may be, for example, a propagated data signal containing program code 1818. For example, computer readable signal media 1826 may be an electromagnetic signal, an optical signal, and/or any other suitable type of signal. These signals may be transmitted over communications links, such as wireless communications links, optical fiber cable, coaxial cable, wire, and/or any other suitable type of communications link. In other words, the communications link and/or the connection may be physical or wireless in the illustrative examples.

In some illustrative embodiments, program code 1818 may be downloaded over a network to persistent storage 1808 from another device or data processing system through computer readable signal media 1826 for use within data processing system 1800. For instance, program code stored in a computer readable storage medium in a server data processing system may be downloaded over a network from the server to data processing system 1800. The data processing system providing program code 1818 may be a server computer, a client computer, or some other device capable of storing and transmitting program code 1818.

The different components illustrated for data processing system 1800 are not meant to provide architectural limitations to the manner in which different embodiments may be implemented. The different illustrative embodiments may be implemented in a data processing system including components in addition to or in place of those illustrated for data processing system 1800. Other components shown in FIG. 18 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1804 may take the form of a hardware unit that has circuits that are manufactured or configured for a particular use. This type of hardware may perform operations without needing program code to be loaded into a memory from a storage device.

For example, when processor unit 1804 takes the form of a hardware unit, processor unit 1804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1818 may be omitted because the processes for the different embodiments are implemented in a hardware unit.

In still another illustrative example, processor unit 1804 may be implemented using a combination of processors found in computers and hardware units. Processor unit 1804 may have a number of hardware units and a number of processors that are configured to run program code 1818. In this depicted example, some of the processes may be implemented in the number of hardware units, while other processes may be implemented in the number of processors.

As another example, a storage device in data processing system 1800 is any hardware apparatus that may store data. Memory 1806, persistent storage 1808, and computer readable media 1820 are examples of storage devices in a tangible form.

In another example, a bus system may be used to implement communications fabric 1802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1806, or a cache, such as found in an interface and memory controller hub that may be present in communications fabric 1802.

The different illustrative embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, a magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output (I/O) devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The illustrative embodiments relate to an integrated resource tracking system and, more particularly, to a method and system which integrates multiple systems and applications together to determine trends by analyzing tags and/or keywords of multiple users over the multiple integrated systems and applications. The terms used below refer to similar objects described above with respect to FIG. 1 through FIG. 18. Thus, the following may be read in view of FIG. 1 through 18. Additional details are provided below.

The illustrative embodiments relate to an integrated resource tracking system and, more particularly, to a method and system which integrates multiple systems and applications together to determine trends by analyzing tags and/or keywords of multiple users over the multiple integrated systems and applications. Hereinafter the integrated resource tracking system can be referred to as processes, systems, ADPTrackr, the tracker of the illustrative embodiments, and variants thereof.

Tags are basic words or phrases that are commonly used as reference points when describing an element of value or clarification of an associated object. Tags can be linked to meta-data elements within a global human capital management platform. While tags can theoretically be linked to any data model objects, the following objects will support tags in its first out-of-box release: global person, position, organization unit, job family, capability, and asset, as examples.

The tracker of the illustrative embodiments may be backed by a REST-JSON API, written in Ruby on Rails version 4; although this example, and the examples below, do not necessarily limit the claimed inventions as other implementations are contemplated by the illustrative embodiments. The application programming interface is used to import data from the owner of the tracking program and third party application programming interfaces, and to serve the tracker of the illustrative embodiments front-end. The development environment includes the Ruby Mine integrated development environment, and can use the rails-sAPI gem. The API may include three models: work item, tag, and person, though more or fewer models may be present. There is a many-to-many relationship between them. The models inherit from Active Record: the object relational mapping built into Rails, which comes preconfigured with sqlite3 for development, and the controllers of the illustrative embodiments can support at least the following actions: index, show, create, update, and destroy. Resources are automatically routed, including nested resources. Application programming interfaces can be tested using the Postman extension to GOOGLE® CHROME®.

The functionality behind the tracker of the illustrative embodiments may include both product functionality and a new product. For example, the functionality may include:

(i) the ability to integrate external third party sources (such as CONFLUENCE®, OUTLOOK®, RALLY®, YAMMER®, etc.) with an aggregator in order to track activities users perform on a daily, weekly, monthly, and yearly base, and to find top trends within an organization; and (ii) the overlaying solution may leverage the parsing of external data in order to align with a goal and performance management product.

In addition, the tracker of the illustrative embodiments may provide quick insights into the top trends within an organization. For example, the tracker may:

(i) link to the tools an organization uses already (in reference to third party application);

(ii) integrate with numerous third party tools and have an exposed application programming interface that allows third party applications to integrate with its activity feed. The default applications may be as described above;

(iii) bridge the gap between goal management and ongoing organization activity by allowing a user to manually and automatically link activities to defined goals. For example, users can manually select an activity feed from an external source, and link it to a given goal. Automatically, users can associate a tag or reference to a particular goal. When an activity comes in their feed with a link to that tag or reference, the activity is automatically associated with the related goal;

(iv) provide quick insights into the trends within an organization by identifying tags and most common terms and word references through text and data mining. These trends can be measured on an overall organization metric, by department, team, and individual, amongst other things;

(v) show cross-departmental collaboration and alignment by assessing information about individuals collaborating together on a given activity; and (vi) provide an up-to-date status-tracking tool that shows the overarching organizational activity in alignment with the overall organizational, team, and individual goals.

The tracker of the illustrative embodiments may link relevant organization activity (the work individuals do on a daily and ongoing bases) with human resources, performance, strategic planning, and talent management, and their related databases containing relevant information using application programming interfaces. The tracker of the illustrative embodiments may aggregate information from third party application programming interfaces and pool them to provide insights into the knowledge and work within the organization. This knowledge is then leveraged in order to identify the trending activities within an organization and used to identify internal dialect, acronyms, and knowledge, possibly tasks or goals that have not been previously done.

The tracker of the illustrative embodiments can also leverage the information gathered from third party integration tools in order to build out a competency catalog that is aligned with the work being done within the organization. From a strategic management perspective, the application may provide insights into the types of activities being performed in order to achieve various types of goals. For example, the tracker of the illustrative embodiments can identify that, for the goal to 'Build a new product', a product manager typically:

(i) Spends a predetermined time, typically a few weeks, of the goal's start dates doing research and meeting with the user experience research and user interface teams;

(ii) spends the one to three months after the start of a goal in RALLY® or related programs building features and user stories, and in meetings with the scrum team; and (iii) and three to six months into the goal the manager may work with product marketing in order to build go-to-market trends.

In this way, the technical features of the illustrative embodiment solve a technical problem or provide a technical contribution to current systems by integrating systems and tracking trends using terms, tags, and keywords from one or multiple users on a team or over an enterprise or any subset thereof. The illustrative embodiment can monitor data from many different real-time data sources to achieve these and other technical solutions.

From an individual review perspective, the tracker of the illustrative embodiments can provide a timeline of all the work an individual has done throughout the course of the performance cycle. In this context, the individual can view an interactive map that shows their work patterns, key collaborators, and overall accomplishments throughout the year. The tracker of the illustrative embodiments has the ability to integrate with feedback modules, and may provide a tool for building/cascading strategic goals and defining performance review cycles. The tracker of the illustrative embodiments may provide tools to link with project management and customer relationship management solutions in order to incorporate project plans, customer data, and related tasks into the application and its human resources processes.

Attention is now turned to the integration of MICROSOFT® OUTLOOK® with the tracker of the illustrative embodiments. Current integration steps may include:

i. The user may be prompted with a credential entry screen, similar to userAuthFrontEnd.png. This front end may be generated by index.html. On this page, the user may supply their OUTLOOK® username and password, as well as the particular OUTLOOK® folders they wish to integrate with, such as "outbox", "in box", and "calendar";

ii. once the user submits the request, app-dev.js may execute one to three processes to handle the user request; one for each OUTLOOK® folder;

iii. from this point forward, the user's inbox is provided as example, although other OUTLOOK® folders are handled in a similar fashion;

iv. the app-dev.js passes parameters to soap_request_inbox.js including the initial soap envelope id_request_inbox.xml as well as the user's credentials;

v. the soap_request_inbox.js passes id_request_inbox.xml to the OUTLOOK® Exchange Web Server (EWS) along with the user's credentials via a CURL command;

vi. the EWS responds to the CURL command and returns an xml file of unique IDs. These IDs correspond to all of the email items currently in the user's inbox;

vii. the soap_request_inbox.js traverses the xml returned by EWS, extracts the unique IDs, and dynamically generates a second soap request (XML file);

viii. this second soap request now queries the EWS for further detail on the emails identified by the unique IDs via a similar CURL command;

ix. the EWS returns yet another XML file, which is traversed for each unique ID. The soap_request_inbox.js extracts fields including, but not limited to: subject, sensitivity, dateRecieved, importance, dateSent, senderN arne, senderEmail, recipients, ccrecipients, and textBody from an email; and x. those extracted fields are then persisted in MongoDB in the inbox collection. Steps iii-ix are repeated for sent items, as well as calendar information, if the user elects to pull/persist those data.

By way of another example, current RALLY® integration includes:

i. the rallyPullTasks.js currently fetches all current user Tasks via the RALLY® application programming interface. When fetching the tasks, information such as task: description, Owner, Project, Parent, Children, TaskName, State, etc. is considered; and ii. for each current task, rallyPullTasks.js then persists each task using the defined schema into MongoDB's rallyTasks collection. Currently, the product fetches and persists the current sprint's user tasks at the time of execution of rallyPullTasks.js. This gives a snapshot of what is being developed or worked on, but does not consider the history of those work items.

Figures described above can be representative of block diagrams and underlying functionality of the screen displays in accordance with aspects of the illustrative embodiments, which are implemented within the environments shown in FIG. 11 through FIG. 13. The figures described and shown herein can thus be illustrative of a system, a method, and/or a computer program product and related functionality implemented on the computing system of FIG. 16 through FIG. 18, in accordance with aspects of the illustrative embodiments.

Attention is now turned to profile definitions. The tracker of the illustrative embodiments may provide four distinct benefits for strategic management. Each benefit may be divided into independent modules within the overarching solution. These modules include strategic planning and ongoing goal management, status reporting and activity tracking, performance management, and reporting and analytics.

Attention is first turned to the strategic planning and ongoing goal management module. This module may provide tools for short and long term workforce strategic plans through the use of guiding tools that support and advise organization transformation activities within the organization. The tracker of the illustrative embodiments supports the definition of strategic goals and enables the monitoring of workforce activity towards these goals. It enables organizations to understand which goals are on track, and which goals may be delayed.

With the integration of activity tracking, subsequently described, the strategic planning solution can predictively and proactively recognize changes in organization practices and explicitly identify the following items:

i. planned and unplanned initiatives the workforce is actively focusing on;

ii. emerging trends that are surfacing with the organization;

iii. impact of changing current strategic initiatives, and who is impacted most;

which departments are most aligned with the strategic vision;

iv. how the strategic vision has evolved over time; and v. recommended adjustment to the strategic vision based on actual recorded activities and their success rates.

The strategic planning and goal management module is unique due to many factors, including the ability for a software tool to analyze the activity of an organization's organizational practices, and provide intelligent recommendations on desired changes to the corporate strategy. This functionality is not available using traditional project management software. In the most rudimentary explanation, this module serves as an artificial intelligence engine to support the executive leadership in understanding the internal dynamics of the organization by providing technical capabilities to integrate different systems together, analyze information passed within the system and users, and determined trending points. Beyond the clear strategic benefits, the tracker of the illustrative embodiments changes the way goals and performance management can be used within the organization.

The tracker of the illustrative embodiments need not be a top-down goal management process, but rather an organically emerging goal builder which thrives on the activities individuals are doing today, and provides insights on how to optimize that activity towards a more strategic organizational purpose. This ability is a completely different paradigm as to what organizations do today. This ability allows individuals to continuously monitor their ongoing goals and view their trending patterns, as described more in the next section particularly over an entire enterprise using multiple integrated systems.

Attention is now turned to the next module, status reporting and activity tracking. Purposes of the tracker of the illustrative embodiments may include enriching organization operations, consolidating real information about an organization, and providing metrics for leaders, managers, and individuals to ensure the organization is aligned and individuals are on track with their tasks and responsibilities. The tracker of the illustrative embodiments aims to reduce or eliminate the process of manual status reporting by providing simple tools for parsing information about individual activities. By building a visual pinboard of 'My Work', individuals can quickly visualize their work life and work activity.

With full control on the individual level, the product aids individuals in managing their information dashboard, and filtering any conflicting or non-relevant information. By integrating with the software and applications used by the workforce today, the tracker of the illustrative embodiments can track active work within the organization, and processes information to understand what work the individuals are actively doing.

Examples of tools that may be integrated with the solution provided herein include, but are not limited to:

OUTLOOK®—processing of work calendars and email exchanges;

RALLY®—processing of backlog definition, status, and ownership assignment;

CONFLUENCE®—active posts, updates, and discussions raised by users;

SALESFORCE®—processing of sales data to identify closing times and general sales metrics by user;

GOOGLE® DOCS®—for processing of shared information and collaboration across teams; and OFFICE® & SHAREPOINT®—ability to implement rich site summary (RSS) changes to a document for processing in the tracker of the illustrative embodiments.

Beyond the software identified above, the tracker of the illustrative embodiments may have exposed application programming interfaces on a marketplace of applications and may encourage third parties to provide integration tools with their software such that the above examples should not be considered an exhaustive list.

Attention is now turned to tagging and activity tracking. Tagging and text/data processing may enable the connection of free text with tangible keywords about an individual or a body of work. Tagging assists in the processing of work feeds from third party solutions as tagging enables the software to make relevant connections across different bodies of work.

Individual, team, and departmental trending tags may be identified by counting the number of times a tag is used by the person/team/department. Such trending tags may also be identified by monitoring the frequency in which the tag was used. The more frequently the tag is used, and the most recently it has been used, the more that tag is trending. For teams and departments, the span of which the tag is used is also relevant. The span refers to the amount of people using it.

Watching trends: All users can put a 'watch' on a particular trend/tag. When 'watching a tag', the user gets prompted when a tag is being used. There are various prompt options that can define how the user is notified, such as but not limited to email notification, application alert, weekly report, and others.

Promoting trends: Users such as managers and executive leaders can promote trends for their span of control. When promoting a trend, all individuals within that organization will see the trend as prompted by the promoted individuals in their dashboard, and with a recommendation to work towards that trend. A message by the promoter can be provided alongside the trend.

Work dashboard: The work dashboard may provide insights on numerous traditionally intangible factors that allow an individual to understand their purpose within an organization and to process their strengths within the organization.

Gauging alignment of goals: By processing departmental and individual goals and analyzing the trends from the individual's work activity, the tracker of the illustrative embodiments can identify how aligned an individual is to their existing goals, at an individual, departmental, and strategic level.

Managing individual goals: Individuals can generate new individual goals. While they can do this manually, new goals are typically generated based on recommendations from the system. Recommendations may be based on the set of trends, that is, tags, surfacing from an individual feed. Individuals may also be advised by the system to collaborate with another individuals based on the similarity of their goals. They may then create a collaborating page to align between their individual initiatives.

When reviewing their dashboard, individuals can create auto-filters to process activities towards goals. By recognizing the type of activities associated with a given goal, the system may recognize that a given activity should be auto-associated with a goal. Auto-associations are based on a tag or set of tags used in the activity itself.

Additionally, when an individual views a given goal, he/she can define specific tags or combinations of tags that are relevant for that goal. In doing such, he or she can also review the system recommended tags for the goal, and adjust as needed.

Viewing work trends: In reviewing their dashboard and profile, individuals may see a tag cloud based on the top internal organization acumen used by themselves. A tag cloud is like a word cloud, though the identifiers are tags. The tag cloud is an exceptional way for peers and managers to better understand the professional knowledge and active engagement the individual is currently focused on.

In some illustrative embodiments, additional tags cannot be added into the word cloud. Individuals can choose to hide any of the tags within the cloud. In other illustrative embodiments, tags may be added or removed from the tag cloud. Individuals might be able to see hidden tags. Individuals also may have access to individual work patterns including an understanding of their general work habits such as, work hour patterns; types of activities performed throughout the week based on tools; emerging trends for them and their team based on tags identified in their work activity; and top collaborators and contributors towards their goal or trend.

Understand organizational influence: Finally, individuals can measure themselves on their level of expertise within the organization based on tag usage, collaboration span, and tag frequency. Collaboration span may be a number of people with whom an individual collaborates, but also could be extended to team or organizational comparisons. Individuals can be measured via the following influence factors:

i. Specialist: uniqueness of their tag cloud and strength of the tags within the cloud;

ii. Leader: breath of engagement in various goals and with various collaborators based on volume of different activities and volume of people the individual is working with; and iii. Team Player: high supporter of departmental goals and team initiatives.

FIG. 3, described above, is an example of a sample activity tracker dashboard. With an application that consolidates real-time information about work activities by an individual and groups of individuals, the process of traditional status reporting becomes obsolete. Just as managers and executives can promote trends down the organization, individuals and their managers can upstream recommendations and communications to their managers. These upstream notifications provide insights and comments on a given tag, trend, or goal to ensure clarification is provided when needed.

Attention is now turned to the performance management modules. The tracker of the illustrative embodiment's individual-centric performance management is a continuously aligned process tracking ongoing activities. With a spot-check report, individuals and managers can compile a profile of individuals, including their activities, their alignment to goals, collaborations with others, and tag clouds associated with them.

Feedback Gathering: At any point in time, an individual or manger can request and give feedback from/to other individuals. Based on interaction patterns with other individuals, the tracker can intelligently request feedback from colleagues about a particular individual.

Typical Feedback may be short, with an option to give an individual a thumbs-up or accolades, possibly alongside a comment. A more formal feedback review can also be requested in which the individual is evaluated based on the performance of their goals. Peers can be requested to give feedback on an individual's goal accomplishment, but only if they had substantial involvement with the goal, as assessed by the system. The system therefore is intelligent enough to understand which aspects of the goal the peer should participate in reviewing.

Annual Performance Review: The system expects that individuals and their managers meet regularly to discuss the individual's performance. The system therefore may be designed to support continuous communications and to make blockers and successes transparent to the manger. The annual review provides a compilation of all achievement accomplished by the individuals throughout the year. Differentiating the tracker of the illustrative embodiments from other solutions, the system provides clear insights into the changes made to the individual's goals over the course of the year. The system therefore not only provides an assessment of the individual's capabilities, but also the potential volatility within the team or organization. While the summary of the individual's performance over the year can be accessed at any time, it is during the formal annual review that comments are documented between both the individual and manager. This session should be treated as a retrospective over the year.

Both the individual and manager may provide their feedback in the form of a rating for each of the goals set by the individual, and a final rating may be calculated. A flag may be raised if there is a high discrepancy between the individual and manager ratings, or if either rating is significantly different from the system's projected average rating based on the activities gathered.

Talent Calibration: Managers or other users can maintain a continuous talent calibration grid depicting their individuals under their authority on a performance versus potential axis. The system then may be extended to overlay a velocity versus impact metric, showing the volume of activities an individual performs on an ongoing basis, their overall influence factors, and goal completion metrics.

Attention is now turned to the reporting and analytics module. Reports and analytics are embedded throughout the tracker of the illustrative embodiments to help users compare and analyze the information stored in the system. The reporting engine provides a graph database analysis of the top and emerging trends within the organization, department, team, or individual. The reporting engine may provide insights into the top trends that are associated with high, medium, and low performers, and look for correlations that can help the organization improve its organizational structure and strategic initiatives. The reporting engine also may identify the arteries of the organization based on individual influence factors and may provide search capabilities to fully drill down into the data provided.

Detailed Functionality: The tracker of the illustrative embodiments may be designed for knowledge workers, with specifically designed functionality for individual, line-manager, multi-level manager, and executive level users.

Interaction with the tracker and accessing the application: Integrated via a single sign on function, with initial integration point to and REDBOX ENTERPRISE® and VANTAGE®. There may be an optional independent login.

On initial deployment of the system, the client may specify the following elements, which are then used as part of the tracking process: What are the organization core values, what is the corporate mission statement, and all strategically set goals for the organization. Information may be entered in a front end user interface designed for the executive user. Tasks can be delegated to human resources or assistant users.

In addition, the client's administrator may specify which tools they would like to integrate with the tracker of the illustrative embodiments in order to process activity feeds. While it is not mandatory to integrate with a tool, it is highly recommended for significantly higher insights and functionality.

When each end user logs into the system, they will have the option to configure their individual connections to the enabled application. If the client already has a single sign on between the third party look and their account via their internal portal, this will not be required.

The foregoing examples have been provided merely for the purpose of explanation and are in no way to be construed as limiting of the present illustrative embodiment. While aspects of the present illustrative embodiment have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present illustrative embodiment in its aspects. Although aspects of the present illustrative embodiment have been described herein with reference to particular means, materials, and embodiments, the present illustrative embodiment is not intended to be limited to the particulars disclosed herein; rather, the present illustrative embodiment extends to all functionally equivalent structures, methods and uses, such as are within the scope of the appended claims.

Thus, the illustrative embodiments may provide for a method implemented in a computer system which comprises: integrating multiple systems and applications; and determining trends by analyzing tags and/or keywords of multiple users over the integrated systems and applications. This method may be varied.

For example, the multiple systems and applications may be computer systems and software applications including communication applications. The method may include using APIs to import data from the multiple systems and applications. In this case, the APIs may include at least three models: work item, tag, and person with many-to-many relationship between them.

In another illustrative embodiment, the method may also include integrating external third party sources with an aggregator in order to track activities users perform on a daily, weekly, monthly, and yearly base, and find top trends within an organization. In this case, the method may also include parsing of external data, in order to align with a goal and performance management product.

In still another illustrative embodiment, the integrator integrates with numerous third party tools and has an exposed API that allows third party applications to integrate with its activity feed. In yet another illustrative embodiment, the method further includes associating a tag or reference to a particular goal and, when an activity comes in a feed with a link to the tag or reference, the activity is automatically associated with a related goal. In still another illustrative embodiment, identifying trends may include identifying tags and most common terms and word references through text and data mining. In yet another illustrative embodiment, the method may further include analyzing an activity and providing intelligent recommendations on required changes by identifying the trends.

Still other variations are possible. For example, the illustrative embodiments may provide for a computer system for generating trending information for recommendations, comprising: a hardware memory device that stores program instructions; and a processor that executes the program instructions and causes the computer system to perform the steps of the above examples and any combination thereof. In another example, the illustrative embodiments may provide for a computer program product comprising computer readable program instructions stored on non-transitory computer readable storage medium, the computer readable program instructions causing a computing device to perform the steps of the above examples and any combination thereof.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer network comprising:
    a first computer, operable by a first user, in communication with the server computer, wherein the first computer has a first processor and a first non-transitory computer readable storage medium storing first program code which, when executed by the first processor, implements a first software tool having a first function and a second software tool having a second function;
    a second computer, operable by a second user, in communication with the server computer, the second computer having a second processor and a second non-transitory computer readable storage medium storing second program code which, when executed by the second processor, implements the first software tool having the first function and the second software tool having the second function;
    a server computer having a server processor and a server non-transitory computer readable storage medium, wherein the server non-transitory computer readable storage medium stores third program code which, when executed by the server processor, is configured to:
        gather first data regarding activities of the first user and the second user utilizing the first software tool;

gather second data regarding activities of the first user and the second user utilizing the second software tool;

identify a set of digital tags indicating that the activities utilizing the first software tool and the activities utilizing the second software tool are associated with a performance goal; and based on the first data and the second data, link activities of the first user and the second user to the performance goal, wherein the performance goal is for any one of the first user, the second user, a team including at least the first user or the second user, or an organization to which the first user and the second user belong, and wherein, in executing the third program code, a communications link between the server computer and the first computer or the second computer is improved; and a physical display device in communication with the server computer and having a graphical user interface comprising:

a first area of the graphical user interface that displays proportional use information as a set of annular segments in a circle graph, the proportional use information comprising a proportional comparison of: use of the first software tool on both the first computer and the second computer relative to use of the second software tool on both the first computer and the second computer;

a second area of the graphical user interface that displays a first set of selectable icons representing the first user, the second user, and the team, wherein the circle graph in the first area is updated to display only use corresponding to a selected icon of the first set in response to a selection of one of the first set of selectable icons from the second area of the graphical user interface; and a third area of the graphical user interface that displays a second set of selectable icons representing a set of performance goals, wherein the circle graph in the first area is updated to display only a total number of activities corresponding to a selected performance goal in response to a selection of one of the second set of selectable icons from the third area of the graphical user interface.

2. The computer network of claim 1, wherein the third program code is further configured to:

based on the first data and the second data, calculate a first amount of work the first user contributed to the performance goal and calculate a second amount of work the second user contributed to the performance goal.

3. The computer network of claim 1, wherein the third program code is further configured to:

based on the first data and the second data, calculate a performance of the first user relative to the second user.

4. The computer network of claim 2, wherein the first user has a first assigned goal and wherein the third program code is further configured to:

responsive to a selection of an icon representing the first assigned goal, updating the circle graph in the first area to display only a total number of activities by the first user for the first assigned goal.

5. The computer network of claim 2, wherein the third program code is further configured to:

calculate, for the first user, a proportional use of the first software tool and the second software tool; and responsive to a selection of an icon representing the first user from the second area of the graphical user interface, updating the circle graph in the first area to display only proportional use of the first software tool and the second software tool by the first user.

6. The computer network of claim 5, wherein the third program code is further configured to:

display which of the first user and the second user performs a most number of particular activities towards the performance goal, whereby it may be determined which user should be consulted regarding a question regarding the particular activities.

7. The computer network of claim 1, wherein the performance goal is for the organization, wherein the organization has a plurality of departments, wherein the first user is in a first department and the second user is in a second department, and wherein the third program code is further configured to:

based on the first data and the second data, display cross-departmental collaboration between the first user and the second user.

8. An apparatus comprising:

a first computer, operable by a first user, wherein the first computer has a first processor and a first non-transitory computer readable storage medium storing first program code which, when executed by the first processor, implements a first software tool having a first function and a second software tool having a second function;

a second computer, operable by a second user, the second computer having a second processor and a second non-transitory computer readable storage medium storing second program code which, when executed by the second processor, implements the first software tool having the first function and the second software tool having the second function;

a server computer, in communication with the first computer and second computer, having a server processor and a server non-transitory computer readable storage medium; wherein the server non-transitory computer readable storage medium stores third program code which, when executed by the server processor, is configured to:

gather first data regarding activities of the first user and the second user utilizing the first software tool;

gather second data regarding activities of the first user and the second user utilizing the second software tool;

identify a set of digital tags indicating that the activities utilizing the first software tool and the activities utilizing the second software tool are associated with a performance goal; and based on the first data and the second data, link activities of the first user and the second user to the performance goal, wherein the performance goal is for any one of the first user, the second user, a team including at least the first user or the second user, or an organization to which the first user and the second user belong, and wherein, in executing the third program code, the server computer improves a communications link between the server computer and the first computer or the second computer; and a physical display device in communication with the server computer and having a graphical user interface comprising:

a first area of the graphical user interface that displays proportional use information as a set of annular segments in a circle graph, the proportional use information comprising a proportional comparison of: use of the first software tool on both the first computer and the second computer relative to use of the second software tool on both the first computer and the second computer;

a second area of the graphical user interface that displays a first set of selectable icons representing the first user, the second user, and the team, wherein the circle graph in the first area is updated to display only use corresponding to a selected icon of the first set in response to a selection of one of the first set of selectable icons from the second area of the graphical user interface; and a third area of the graphical user interface that displays a second set of selectable icons representing a set of performance goals, wherein the circle graph in the first area is updated to display only a total number of activities corresponding to a selected performance goal in response to a selection of one of the second set of selectable icons from the third area of the graphical user interface.

9. The apparatus of claim 8, wherein the third program code is further configured to:

based on the first data and the second data, calculate a first amount of work the first user contributed to the performance goal and calculate a second amount of work the second user contributed to the performance goal.

10. The apparatus of claim 8, wherein the third program code is further configured to:

based on the first data and the second data, calculate a performance of the first user relative to the second user.

11. The apparatus of claim 9, wherein the first user has a first assigned goal and wherein the third program code is further configured to:

responsive to a selection of an icon representing the first assigned goal, updating the circle graph in the first area to display only a total number of activities by the first user for the first assigned goal.

12. The apparatus of claim 9, wherein the third program code is further configured to:

calculate, for the first user, a proportional use of the first software tool and the second software tool; and responsive to a selection of an icon representing the first user from the second area of the graphical user interface, updating the circle graph in the first area to display only proportional use of the first software tool and the second software tool by the first user.

13. The apparatus of claim 12, wherein the third program code is further configured to:

display which of the first user and the second user performs a most number of particular activities towards the performance goal, whereby it may be determined which user should be consulted regarding a question regarding the particular activities.

14. The apparatus of claim 8, wherein the performance goal is for the organization, wherein the organization has a plurality of departments, wherein the first user is in a first department and the second user is in a second department, and wherein the third program code is further configured to:

based on the first data and the second data, display cross-departmental collaboration between the first user and the second user.

15. A method implemented in a server computer having a server processor and a server non-transitory computer readable storage medium, the server computer being in communication with a first computer, operable by a first user, wherein the first computer has a first processor and a first non-transitory computer readable storage medium storing first program code which, when executed by the first processor, implements a first software tool having a first function and a second software tool having a second function, the server computer being in communication with a second computer, operable by a second user, the second computer having a second processor and a second non-transitory computer readable storage medium storing second program code which, when executed by the second processor, implements the first software tool having the first function and the second software tool having the second function, wherein the server non-transitory computer readable storage medium stores third program code which, when executed by the server processor, implements the method, the method comprising:

gathering first data regarding activities of the first user and the second user utilizing the first software tool;

gathering second data regarding activities of the first user and the second user utilizing the second software tool;

identifying a set of digital tags indicating that the activities utilizing the first software tool and the activities utilizing the second software tool are associated with a performance goal;

improving, using the server computer, a communications link between the server computer and the first computer or the second computer by linking, based on the first data and the second data, activities of the first user and the second user to the performance goal, wherein the performance goal is for any one of the first user, the second user, a team including at least the first user or the second user, or an organization to which the first user and the second user belong; and displaying, on a physical display device in communication with the server computer, a graphical user interface comprising:

a first area of the graphical user interface that displays proportional use information as a set of annular segments in a circle graph, the proportional use information comprising a proportional comparison of: use of the first software tool on both the first computer and the second computer relative to use of the second software tool on both the first computer and the second computer;

a second area of the graphical user interface that displays a first set of selectable icons representing the first user, the second user, and the team, wherein the circle graph in the first area is updated to display only use corresponding to a selected icon of the first set in response to a selection of one of the first set of selectable icons from the second area of the graphical user interface; and a third area of the graphical user interface that displays a second set of selectable icons representing a set of performance goals, wherein the circle graph in the first area is updated to display only a total number of activities corresponding to a selected performance goal in response to a selection of one of the second set of selectable icons from the third area of the graphical user interface.

16. The method of claim 15 further comprising:

calculating, based on the first data and the second data, a first amount of work the first user contributed to the performance goal and a second amount of work the second user contributed to the performance goal.

17. The method of claim 15 further comprising:

calculating, for the first user, a proportional use of the first software tool and the second software tool; and altering a physical display device by displaying which of the first user and the second user performs a most number of particular activities towards the performance goal.

\* \* \* \* \*